US008989054B2

(12) United States Patent
Isumi

(10) Patent No.: US 8,989,054 B2
(45) Date of Patent: Mar. 24, 2015

(54) IP DEVICE EXCHANGE APPARATUS AND CALL CONNECTION CHANGING METHOD

(75) Inventor: Shinya Isumi, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1704 days.

(21) Appl. No.: 12/144,908

(22) Filed: Jun. 24, 2008

(65) Prior Publication Data

US 2009/0003322 A1 Jan. 1, 2009

(30) Foreign Application Priority Data

Jun. 25, 2007 (JP) ................................ P2007-165813

(51) Int. Cl.
*H04L 12/16* (2006.01)
*H04B 1/56* (2006.01)
*H04M 3/42* (2006.01)
*H04M 7/00* (2006.01)
*H04L 29/06* (2006.01)
*H04M 3/58* (2006.01)

(52) U.S. Cl.
CPC ............. *H04L 65/1053* (2013.01); *H04M 3/58* (2013.01); *H04L 65/1069* (2013.01); *H04L 65/1083* (2013.01)
USPC ........... 370/259; 370/260; 370/270; 370/271; 379/212.01; 379/221.1

(58) Field of Classification Search
CPC ............. H04M 3/42; H04M 3/42212; H04M 3/42314; H04M 3/54
USPC ............... 370/259, 260, 270, 271; 379/212.1, 379/221.1
See application file for complete search history.

(56) References Cited

U.S. PATENT DOCUMENTS

| 6,731,734 | B1* | 5/2004 | Shaffer et al. ............ 379/202.01 |
| 2002/0141383 | A1* | 10/2002 | Schaefer et al. ............... 370/352 |
| 2005/0048994 | A1* | 3/2005 | Benco et al. .................. 455/517 |
| 2005/0220082 | A1 | 10/2005 | Toyoda |

(Continued)

FOREIGN PATENT DOCUMENTS

| JP | 2004-357218 | 12/2004 |
| JP | 2005-191731 | 7/2005 |

(Continued)

OTHER PUBLICATIONS

English machine translation of JP 2005-191738.

(Continued)

*Primary Examiner* — Un C Cho
*Assistant Examiner* — Jeremy Costin
(74) *Attorney, Agent, or Firm* — Greenblum & Bernstein, P.L.C.

(57) ABSTRACT

An IP device exchange apparatus includes: a connector that is connected to a first IP phone, a second IP phone, and a third IP phone; a memory for storing a coding scheme obtained by call setting which is negotiated between the first and second IP phones; and a controller that, when receiving a call instruction for call connection to the second IP phone from the third IP phone during communication between the first and second IP phones, employs the coding scheme stored in the memory to perform, between the third IP phone and the IP device exchange apparatus, call setting between the second and third IP phones, while maintaining call connection between the first and second IP phones, thereby changing the call connection between the first and second IP phones to call connection between the second and third IP phones.

15 Claims, 17 Drawing Sheets

(56) References Cited

U.S. PATENT DOCUMENTS

| | | | |
|---|---|---|---|
| 2005/0226264 A1 | 10/2005 | Toyoda | |
| 2006/0018267 A1 | 1/2006 | Kobayashi et al. | |
| 2006/0029045 A1 | 2/2006 | Kobayashi et al. | |
| 2006/0153166 A1 | 7/2006 | Kobayashi et al. | |
| 2006/0215584 A1 | 9/2006 | Yoshida | |
| 2006/0294245 A1* | 12/2006 | Raguparan et al. | 709/227 |
| 2008/0101577 A1* | 5/2008 | Frankel | 379/202.01 |

FOREIGN PATENT DOCUMENTS

| | | |
|---|---|---|
| JP | 2005-191738 | 7/2005 |
| JP | 2005-278155 | 10/2005 |
| JP | 2005-303470 | 10/2005 |
| JP | 2006-041731 | 2/2006 |
| JP | 2006-135522 | 5/2006 |
| JP | 2007-043751 | 2/2007 |

OTHER PUBLICATIONS

English machine translation of JP 2006-135522.
English language Abstract of JP 2005-191738, Jul. 14, 2005.
English language Abstract of JP 2004-357218, Dec. 16, 2004.
English language Abstract of JP 2005-278155, Oct. 6, 2005.
English language Abstract of JP 2006-135522, May 25, 2006.
English language Abstract of JP 2006-041731, Feb. 9, 2006.
English language Abstract of JP 2005-303470, Oct. 27, 2005.
English language Abstract of JP 2007-043751, Feb. 15, 2007.
English language Abstract of JP 2005-191731, Jul. 14, 2005.

* cited by examiner

FIG. 2A

| IP PHONE 31 [0] | 192.168.001.010 | enable |
|---|---|---|
| IP PHONE 32 [1] | 192.168.001.012 | disable |
| IP PHONE 33 [2] | 192.168.001.014 | disable |
| ⋮ ⋮ | 192.168.001.020 | enable |
| [n] | 192.168.001.056 | enable |

FIG. 2B

| IP LINE 41 [0] | disable |
|---|---|
| IP LINE 42 [1] | disable |
| ⋮ ⋮ | disable |
| [n] | disable |

FIG. 3

| [0] | VOICE DATA | CHANGE REQUIRED |
|---|---|---|
| [1] | IMAGE DATA | CHANGE NOT REQUIRED |
| ⋮ | | |

FIG. 4A

| | PORT b | PORT a |
|---|---|---|
| [0] | UNUSED | UNUSED |
| [1] | UNUSED | UNUSED |
| : | UNUSED | UNUSED |
| [n] | UNUSED | UNUSED |

FIG. 4B

| | PORT b | PORT a |
|---|---|---|
| [0] | DEVICE INFORMATION (IP PHONE 31)<br>· IP ADDRESS A31<br>· PORT NUMBER P31r<br>· CODEC INFORMATION VOICE G.711 | IN-USE |
| [1] | UNUSED | UNUSED |
| : | UNUSED | UNUSED |
| [n] | UNUSED | UNUSED |

FIG. 4C

| | PORT b | PORT a |
|---|---|---|
| [0] | DEVICE INFORMATION (IP PHONE 31)<br>· IP ADDRESS A31<br>· PORT NUMBER P31r<br>· CODEC INFORMATION VOICE G.711 | DEVICE INFORMATION (IP PHONE 33)<br>· IP ADDRESS A33<br>· PORT NUMBER P33b<br>· CODEC INFORMATION VOICE G.711 |
| [1] | UNUSED | UNUSED |
| : | UNUSED | UNUSED |
| [n] | UNUSED | UNUSED |

FIG. 4D

| | PORT b | PORT a |
|---|---|---|
| [0] | DEVICE INFORMATION (IP PHONE 32)<br>· IP ADDRESS A32<br>· PORT NUMBER P32r<br>· CODEC INFORMATION VOICE G.711 | DEVICE INFORMATION (IP PHONE 33)<br>· IP ADDRESS A33<br>· PORT NUMBER P33b<br>· CODEC INFORMATION VOICE G.711 |
| [1] | UNUSED | UNUSED |
| : | UNUSED | UNUSED |
| [n] | UNUSED | UNUSED |

FIG. 8

```
INVITE MESSAGE

INVITE sip:101@192.168.1.10 SIP/2.0
Via: SIP/2.0/UDP 192.168.1.14:9959
From:"350"<sip:350@192.168.1.10>;tag=d21f193f-96ee-47b9-
9403-e4224a3df07e
To:<sip:101@192.168.1.10>
Call-ID: 4aad90e9-1583-4781-b7db-c4bced3bafbb@192.168.1.14
CSeq: 1 INVITE
Contact:<sip:192.168.1.14:9959>
User-Agent: Windows RTC/1.0
Content-Type: application/sdp
Content-Length: 546 v=0
o=HammerCA001 0 0 IN IP4 192.168.1.14
s=session
c=IN IP4 192.168.1.14
b=CT:1000                                            } SDP
t=0 0                                                  INFORMATION
m=audio 47914 RTP/AVP 97 111 112 6 0 8 4 5 3 101
a=rtpmap:0 PCMU/8000
a=rtpmap:8 PCMA/8000
a=rtpmap:4 G723/8000
```

IP DEVICE EXCHANGE APPARATUS AND CALL CONNECTION CHANGING METHOD

BACKGROUND

1. Technical Field

The present invention relates to an IP device exchange apparatus and a call connection changing method that transmit or receive voice data to control the connection of IP phones during communication.

2. Background Art

In recent years, with the development of IP techniques, IP device exchange apparatuses, which are called IP-PBX (Private Branch eXchange), have widely spread to the offices. In order to implement the functions of PBX according to the related art, some of the IP-PBXs adopt the following changing method. That is, in order to connect IP phones, an IP-PBX terminates the transmission of RTP packets for forwarding voice data once, and the IP-PBX uses a time-division switch as PCM data to switch the connection of the IP phones. Such an IP device exchange apparatus is called an IP enabled PBX or a PBX with VoIP (Voice over Internet Protocol)-GW (Gateway).

Further, a technique has been proposed in which an interface manager is provided to change the destination of RTP packets and transmit the RTP packets, as the related art for call connection in an IP phone network (for example, see JP-A-2005-191738).

Further, the following apparatuses have been proposed: an IP device exchange apparatus that implements Peer-to-Peer communication between IP phones; and an apparatus that use RTP packets to switch image data as well as voice data. Such a changing apparatus is generally called a softswitch or a call control server.

As such, in the IP-PBX, since the time-division switch can perform changing at an arbitrary timing during communication, it is possible to implement the equivalent complicated and various functions as those in the PBX (legacy PBX) according to the related art. For example, the IP enabled PBX has a 'steal' function of changing call connection between IP devices from one IP phone to another IP phone during communication, in response to a request from another IP phone.

However, the IP enabled PBX does not perform Peer-to-Peer communication between IP phones, but the IP enabled PBX system is interposed between the IP phones to control changing therebetween. Therefore, since the IP enabled PBX uses the time-division switch as PCM (pulse-code modulation) data to control changing, the IP enabled PBX repeatedly performs encoding and decoding. As a result, voice quality deteriorates, or apparatuses that can be connected to the IP enabled PBX system are limited to voice apparatuses.

Furthermore, it is necessary that the PBX accepts the connection of various types of IP devices with various functions. In this case, a call control process suitable for the type of IP device is also required.

Meanwhile, since the softswitch according to the related art can implement Peer-to-Peer communication, there is no fear that voice quality will deteriorate. However, it is difficult to change a session at an arbitrary timing during communication according to VoIP. Therefore, the function of the softswitch is considerably deteriorated, as compared the changing function of the PBX.

SUMMARY

Accordingly, an object of the invention is to provide an IP device exchange apparatus and a call changing method capable of changing a session at an arbitrary timing during communication while maintaining the equivalent communication as Peer-to-Peer communication.

According to an aspect of the invention, an IP device exchange apparatus includes: a connector that is connected to a first IP phone, a second IP phone, and a third IP phone; a memory for storing a coding scheme obtained by call setting which is negotiated between the first and second IP phones; and a controller that, when receiving a call instruction for call connection to the second IP phone from the third IP phone during communication between the first and second IP phones, employs the coding scheme stored in the memory to perform, between the third IP phone and the IP device exchange apparatus, call setting between the second and third IP phones, while maintaining call connection between the first and second IP phones, thereby changing the call connection between the first and second IP phones to call connection between the second and third IP phones.

It is necessary for IP phones to match their communication conditions including a coding scheme each other. Therefore, it is necessary to negotiate the communication conditions beforehand. In addition, IP phones without a function compatible with call changing may be difficult to change a call or cannot perform the call changing.

According to the above-mentioned aspect of the invention, the controller employs the coding scheme of the third IP phone which is contained in the call instruction, and the coding scheme which is stored in the memory by call setting, to perform, between the third IP phone and the IP device exchange apparatus, call setting between the second and third IP phones, while maintaining call connection between the first and second IP phones, thereby changing the call connection between the first and second IP phones to call connection between the second and third IP phones. Therefore, when receiving an instruction for call connection to the second IP phone from the third IP phone, the IP device exchange apparatus, instead of the second IP phone, performs call setting between the second and third IP phones, during communication between the first and second IP phones. As a result, it is possible to perform call setting during communication between the IP phones.

In this way, similar to communication between the time-division changing phones according to the related art, it is possible to implement a call changing function between IP phones. In addition, it is possible to perform call changing while maintaining community of coding schemes. Therefore, even when an IP phone is used, a caller can maintain a call during call setting. In addition, since call changing is performed after call setting is completed, it is possible to make the caller feel that call changing is instantaneously performed.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein:

FIG. 2A is a diagram illustrating enable/disable information of an IP phone in a session change enable/disable table stored in a memory shown in FIG. 1;

FIG. 2B is a diagram illustrating enable/disable information of an IP line in the session change enable/disable table stored in the memory shown in FIG. 1;

FIG. 3 is a diagram illustrating a medium information table stored in the memory shown in FIG. 1;

FIGS. 4A to 4D are diagrams illustrating a port management table stored in the memory shown in FIG. 1;

FIG. 8 is a diagram illustrating an example of SDP information shown in FIG. 6;

DETAILED DESCRIPTION

<Structure>
(Embodiment)

Figure 1:
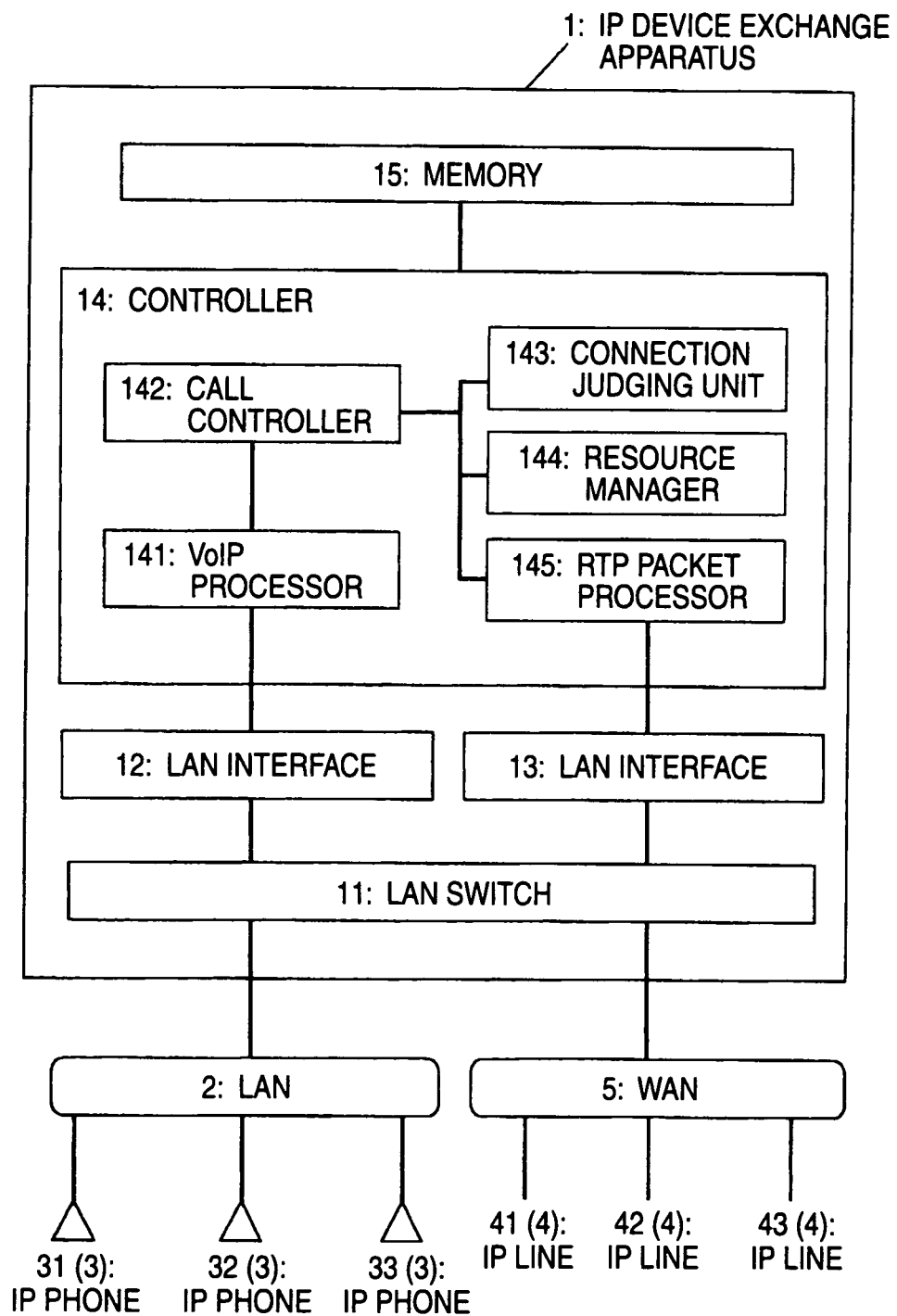
FIG. 1 is a diagram illustrating the overall structure of an IP changing system according to an embodiment of the invention.
Figure 5:
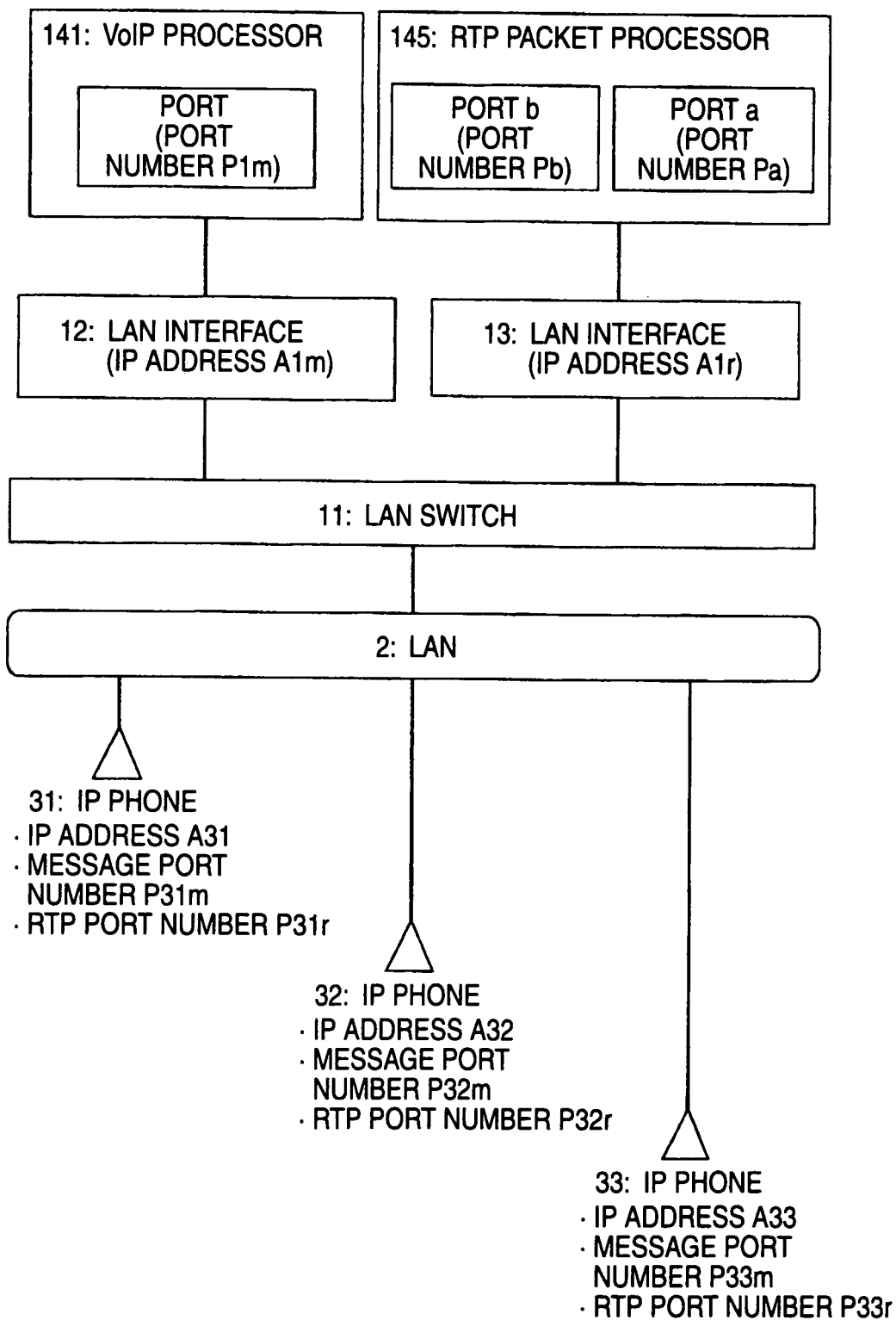
FIG. 5 is a diagram illustrating the IP address and the port number of the IP changing system shown in FIG. 1.

An IP changing system using an IP device exchange apparatus according to an embodiment of the invention will be described with reference to the accompanying drawings. FIG. 1 is a diagram illustrating the overall structure of the IP changing system according to the embodiment of the invention. FIGS. 2A and 2B are diagrams illustrating a session change enable/disable table stored in a memory shown in FIG. 1. Specifically, FIG. 2A is a diagram illustrating enable/disable information of IP phones, and FIG. 2B is a diagram illustrating enable/disable information of IP lines. FIG. 3 is a diagram illustrating a medium information table stored in the memory shown in FIG. 1. FIGS. 4A to 4D are diagrams illustrating a port management table stored in the memory shown in FIG. 1. FIG. 5 is a diagram illustrating the IP address and the port number of the IP changing system shown in FIG. 1.

As shown in FIG. 1, in the IP changing system, an IP device exchange apparatus 1 is connected to IP phones 3 (31-33) corresponding to extension telephones through a LAN (local area network) 2, and IP lines 4 (41 to 43) corresponding to outside lines (or trunk) through a WAN (wide area network) 5 that is provided by a carrier. In FIG. 1, network connection devices for connection to the LAN 2 or the WAN 5, such as a hub and a router, are not is shown. For example, when the WAN 5 is an ADSL line, a modem is needed for connection to the WAN 5. When the WAN 5 is an optical fiber line, circuit terminal equipment is needed for connection to the WAN 5. However, these devices are omitted to be shown in FIG. 1.

The IP phone 3 is a phone used for voice data communication. For example, instead of the IP phone 3, an IP television phone or a soft phone operated on a personal computer may be used. The IP phone 3 is connected to the IP device exchange apparatus 1 by a VoIP in order to communicate therewith. The IP phone 3 is connected to the IP device exchange apparatus 1 using standard communication protocols, such as SIP, H.323, and MGCP, or a dedicated protocol that is independently defined.

Further, in this embodiment, the IP phone is used as an example of an IP device. However, in the invention, communication data is not limited to voice data. The invention can be applied to communication data including voice data and image data that are used for IP TV phones. In addition, communication packets of the IP phone are not limited to voice packets, but communication packets including voice packets and image packets may be used. Therefore, communication packets are simply referred to as packets.

Next, the structure of the IP device exchange apparatus 1 will be described in detail with reference to FIG. 1. As shown in FIG. 1, the IP device exchange apparatus 1 controls changing connection between the IP phones 3, between the IP phones connected to the IP lines 4, and between the IP phone 3 and the IP phones connected to the IP lines 4. In this embodiment, when the term 'IP phones' is not particularly specified, the IP phones include the IP phones 3 (31 to 33) and the IP phones connected to the IP lines 4.

The IP device exchange apparatus 1 includes a LAN switch 11, LAN interfaces 12 and 13, a controller 14, and a memory 15. In the IP device exchange apparatus 1 shown in FIG. 1, an input unit and a display unit for setting setup information is omitted.

The LAN switch 11 has a function of outputting packets from only a specific port that is connected to an apparatus having a destination MAC address included in a control information field (header) of a received packet, with reference to an address table in the LAN switch 11, on the basis of the destination MAC address.

The LAN interfaces 12 and 13 are connectors for communicating with the IP phones through the LAN switch 11. An IP address can be set to each of the LAN interfaces 12 and 13. The LAN interface 12 is used as an interface of a VoIP processor 141, which will be described below, that transmits/receives messages using the VoIP. The LAN interface 13 is used as an interface of an RTP packet processor 145, which will be described below, that transmits/receives RTP packets, such as voice packets including voice data or image packets including image data.

In this embodiment, the LAN interfaces 12 and 13 are individually provided. However, as long as two IP addresses can be set, one LAN interface may be used. In addition, one LAN interface that can be assigned with one IP address may be used as long as it can transmit packets to the VoIP processor 141 and the RTP packet processor 145 using only the port number of the received packet.

The controller 14 includes a CPU, a RAM, a ROM, and a control circuit. The controller 14 is a controller that functions as the VoIP processor 141, a call controller 142, a connection judging unit 143, a resource manager 144, and the RTP packet processor 145 by the program executed by the CPU.

The VoIP processor 141 converts messages that are transmitted from the IP phones 3 (31 to 33) or the IP phones connected to the IP lines 4 according to various protocols into messages corresponding to call control signals that can be processed by the call controller 142, and communicates with the call controller 142. In addition, the VoIP processor 141 converts the message corresponding to the call control signal received from the call controller 142 into a message based on the VoIP, and outputs the converted message to a destination IP phone 3 or a destination IP phone connected to the IP line 4.

The call controller 142 controls connection between the IP phones 3, between the IP phones 3 and the IP phones connected to the IP lines 4, or between the IP phones connected to the IP lines 4 (session setting control), and implements a PBX function therebetween. When receiving a message corresponding to the call control signal transmitted from the VoIP processor 141, the call controller 142 specifies two IP phones to be controlled, and performs session control for changing RTP packets including voice packets between the specified IP phones.

The connection judging unit 143 judges whether the function of the RTP packet processor 145 is needed on the basis of the request of the call controller 142. The connection judging unit 143 judges the connection of the IP phone 3, which is a control target, by reading out enable/disable information of the session change enable/disable table that is stored in the memory 15. In addition, the connection judging unit 143 judges the connection of the IP line 4 by reading out condition information of the medium information table. The enable/disable information of the session change enable/disable table stored in the memory 15 and the condition information of the medium information table stored in the memory 15 form a change setting unit.

The session change enable/disable table and the medium information table stored in the memory 15 will be described in detail with reference to FIGS. 2A, 2B, and 3. The session change enable/disable table shown in FIGS. 2A and 2B indicate setup information which the operator inputs using an input unit while viewing a display unit, and are stored in the memory 15. The session change enable/disable table has the enable/disable information (see FIG. 2A) of the IP phones 31 to 33 corresponding to extension telephones and the other IP phones and the enable/disable information (see FIG. 2B) of the IP lines 41 and 42 corresponding to outside lines and the other IP lines recorded thereon.

In the session change enable/disable table, the IP phones 3 are associated with corresponding IP addresses, and the IP lines 4 are associated with carriers. In this embodiment, the enable/disable information of each IP phone 3 is associated with the IP address of the IP phone 3. The enable/disable information of each IP phones 3 may be associated with a MAC address or an extension number.

For example, the IP phone 31 in the session change enable state means that the IP phone 31 has a function of changing the session and has capability to change a call destination while the IP phone 31 is busy.

As shown in FIG. 2A, when the IP phone 31 can change the session, the IP address '192.168.001.010' of the IP phone 31 and 'enable' indicating validity are stored at an address [0] (an arbitrary address) of the memory 15 as the enable/disable information. In addition, when the IP phone 32 cannot change the session, the IP address '192.168.001.012' of the IP phone 32 and 'disable' indicating invalidity are stored at an address [1].

As shown in FIG. 2B, in the session change enable/disable table of the IP lines 4, 'disable' indicating that all the IP lines including the IP lines 4 (41 and 42) cannot change the sessions is stored at addresses [0] to [n] (arbitrary addresses) of the memory 15.

Further, in the medium information table shown in FIG. 3, condition information indicating whether the session change is needed is associated with type information indicating the type of medium. The type information indicates voice data, image data (still image or moving image), data such as a text file or a file for calculating a table, or a program.

That is, when image data is transmitted in the form of RTP packets, 'change not required' indicating that a session change is not required is set as the condition information. Therefore, the connection judging unit 143 judges that the function of the RTP packet processor 145 is not required. In addition, when voice data is transmitted in the form of RTP packets, 'change required' indicating that a session change is required is set as the condition information. Therefore, the connection judging unit 143 judges that the function of the RTP packet processor 145 is required.

As such, the connection judging unit 143 performs a judging process on the basis of the enable/disable information of the session change enable/disable table, and transmits the judge result to the call controller 142.

In general, since the functions of the IP phones 31 to 33, which are extension phones, have already been known when constructing the IP changing system, only the session change enable/disable table shown in FIG. 2 and the medium information table shown in FIG. 3 have been described above as the setup information that has been stored in the memory 15 beforehand. However, the invention is not limited thereto. For example, the IP device exchange apparatus may analyze messages received from the IP phones and store the information in the memory 15. In this case, it is also possible to implement the same functions as described above.

The resource manager 144 manages the allocation of ports of the IP device exchange apparatus 1 for communication. The port is used to secure a communication path, and is represented in the form of a packet identifier. A memory area is secured in the memory 15, and a port management table is stored in the memory area. Unused information, in-use information, and device information are stored in the port management table as management information.

Next, the port management table will be described with reference to FIGS. 4A to 4D. In FIGS. 4A to 4D, in the port management table, when two IP phones communicate with each other through the RTP packet processor 145 according to an RTP, it is assumed that one IP phone uses a port a, and the other IP phone uses a port b. In this case, the port management table manages the ports a and b. In the port management table, a set of the port a and the port b is sequentially stored at addresses [0] to [n] of the memory 15 so as to correspond to port numbers.

The port management table has unused information, and in-use information or device information stored therein as management information. The unused information indicates that a port is empty. The in-use information indicates that a port is secured. The device information is information related to an IP phone using the port. The device information is composed of the IP address of the IP phone, a port number used to transmit or receive an RTP packet, and codec information indicating a coding scheme. The resource manager 144 allocates a port number to the empty port with reference to the port management table, and notifies the call controller 142 of the allocation of the port number.

The RTP packet processor 145 is a voice packet communication unit that switches the RTP packets from the two IP phones communicating with each other. The packet changing process changes the destination and the source in the header of the RTP packet transmitted to the port numbers that are allocated as the ports a and b to the two IP phones that are communicating, such that Peer-to-Peer communication seems to be performed between the IP phones.

Specifically, the destination address of the RTP packet received from one IP phone through the port a is modified from the IP address of the IP device exchange apparatus 1 to the IP address of the other IP phone, and the source address is modified from the IP address of the one IP phone to the IP address of the IP device exchange apparatus 1. Then, the packets are transmitted from the port b to the other IP phone. Similarly, the destination address and the source address of the RTP packet received from the other IP phone through the port b are modified, and the packets are transmitted from the port a to the one IP phone.

The memory 15 stores the session change enable/disable table, the medium information table, and the port management table. The memory 15 stores extension telephone numbers and various setup information, such as group setup information, in addition to these tables.

Next, the IP addresses and the port numbers of the IP phones 3 (31 to 33) and the IP device exchange apparatus 1 forming the IP changing system according to this embodiment will be described with reference to FIG. 5.

First, as described above, an IP address '192.168.001.010' is set to the IP phone 31. The IP address of the IP phone 31 is referred to as an IP address A31, as shown in FIG. 5. Similarly, an IP address A32 is set to the IP phone 32, and an IP address A33 is set to the IP phone 33.

An IP address A1$m$ which the VoIP processor 141 uses for communication is set to the LAN interface 12 of the IP device exchange apparatus 1. An IP address A1$r$ which the RTP packet processor 145 uses for communication is set to the LAN interface 13 of the IP device exchange apparatus 1.

The IP phone 31 uses a port number P31$m$ to transmit or receive messages according to a VoIP. In addition, the IP phone 31 uses a port number P31$r$ to transmit or receive RTP packets. Similarly, the IP phone 32 uses a port number P32$m$ (for message) and a port number P32$r$ (for RTP packets). The IP phone 33 uses a port number 33$m$ (for message) and a port number 33$r$ (for RTP packets). In the IP device exchange apparatus 1, the VoIP processor 141 uses a port number P1$m$ to transmit or receive messages. In the following description, a port number allocated as the port a by the resource manager 144 is referred to as a port number Pa, and a port number allocated as the port b is referred to as a port number Pb.

<Establishment of Session>

Figure 6:
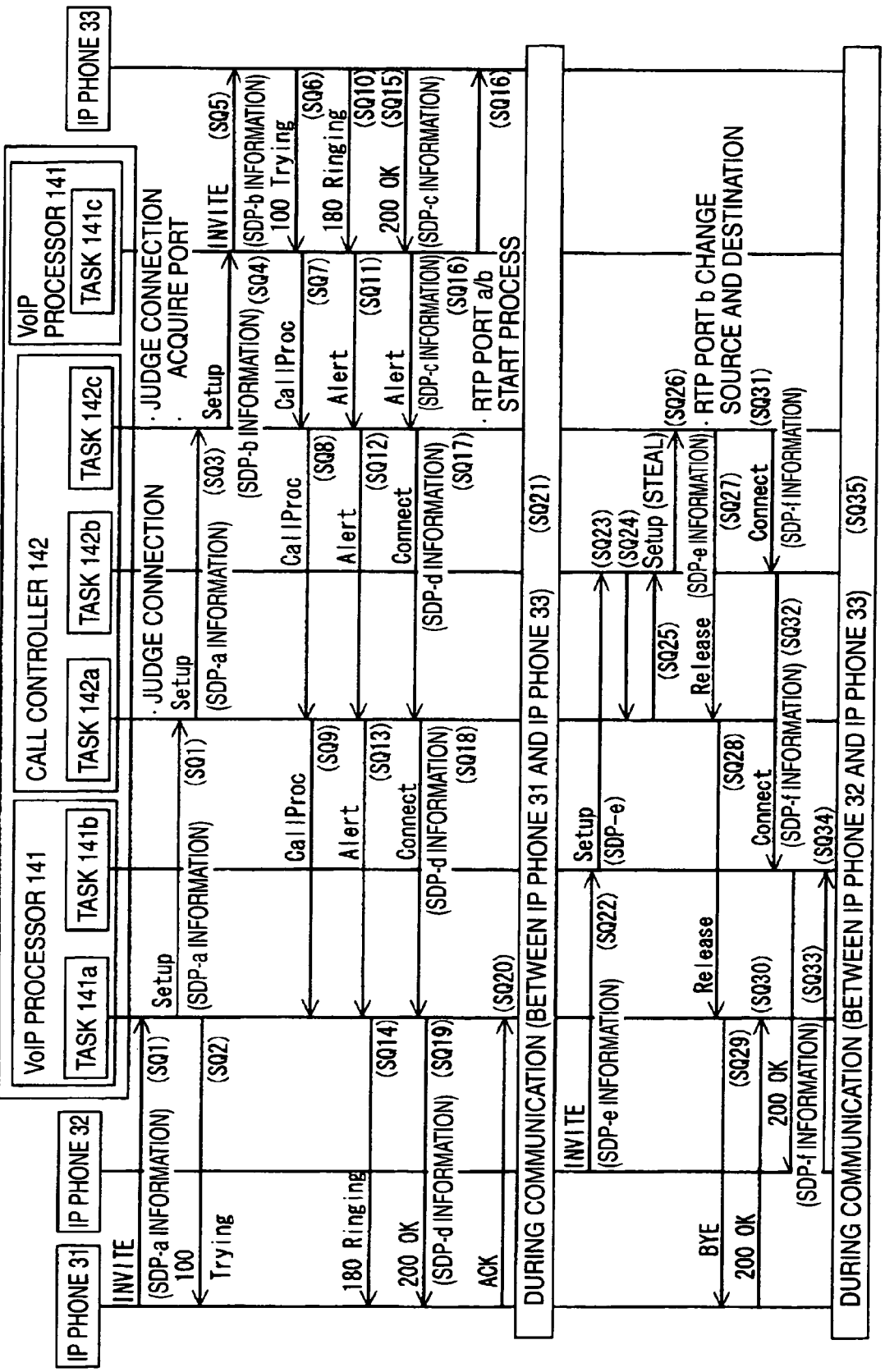
FIG. 6 is a sequence chart illustrating the operation of the system shown in FIG. 1.
Figure 7:
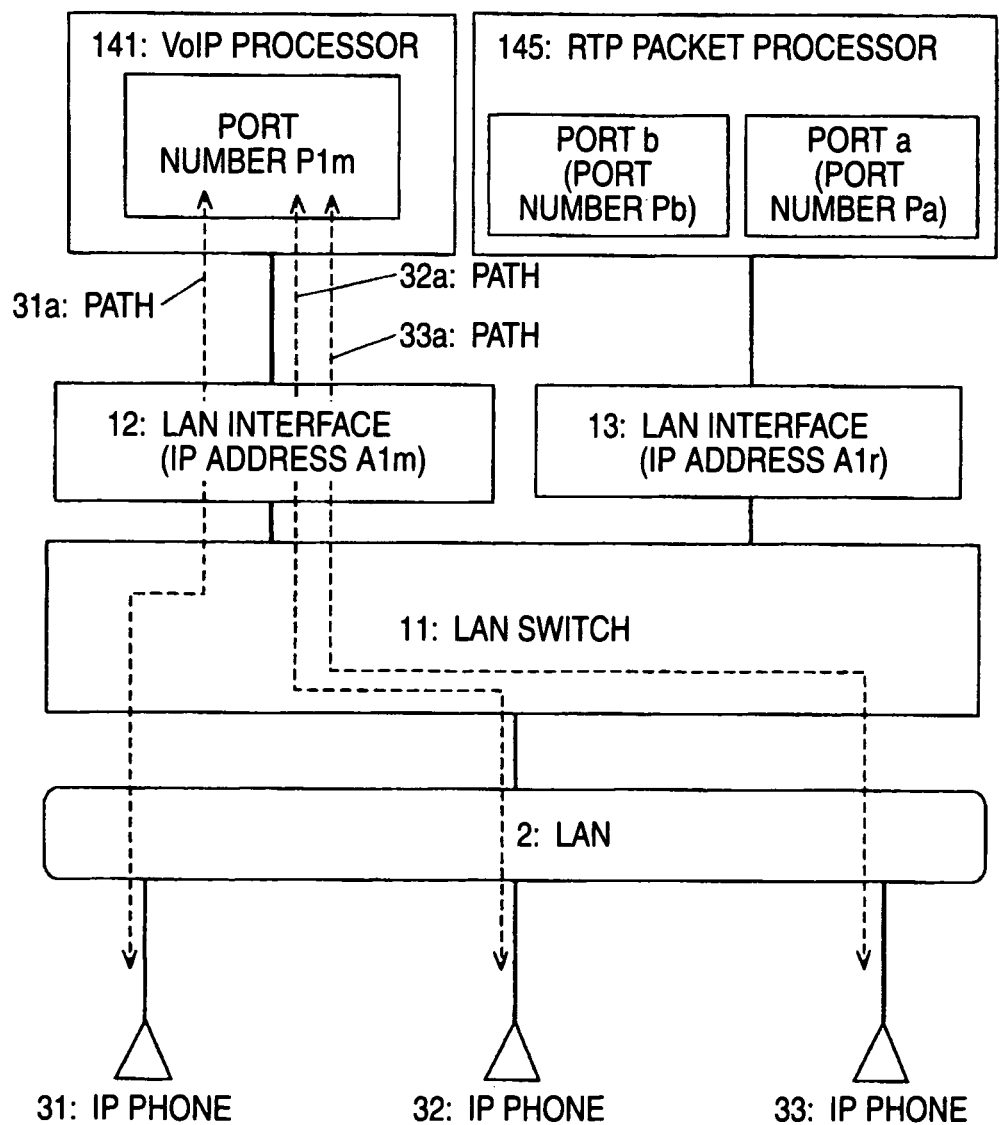
FIG. 7 is a diagram illustrating a path of a message shown in FIG. 6.
Figure 9:
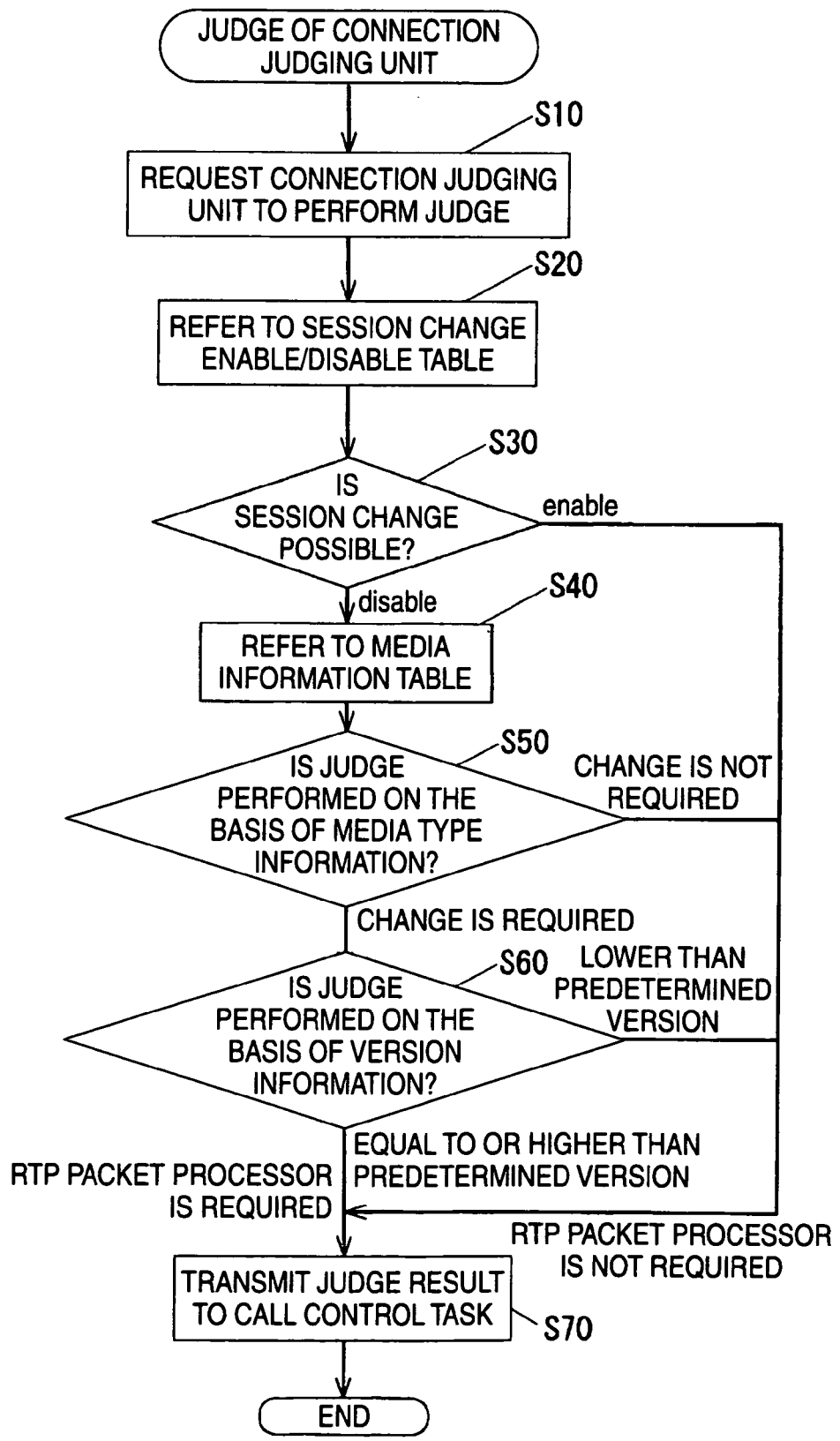
FIG. 9 is a flowchart illustrating a judging operation of a connection judging unit shown in FIG. 1.
Figure 10:
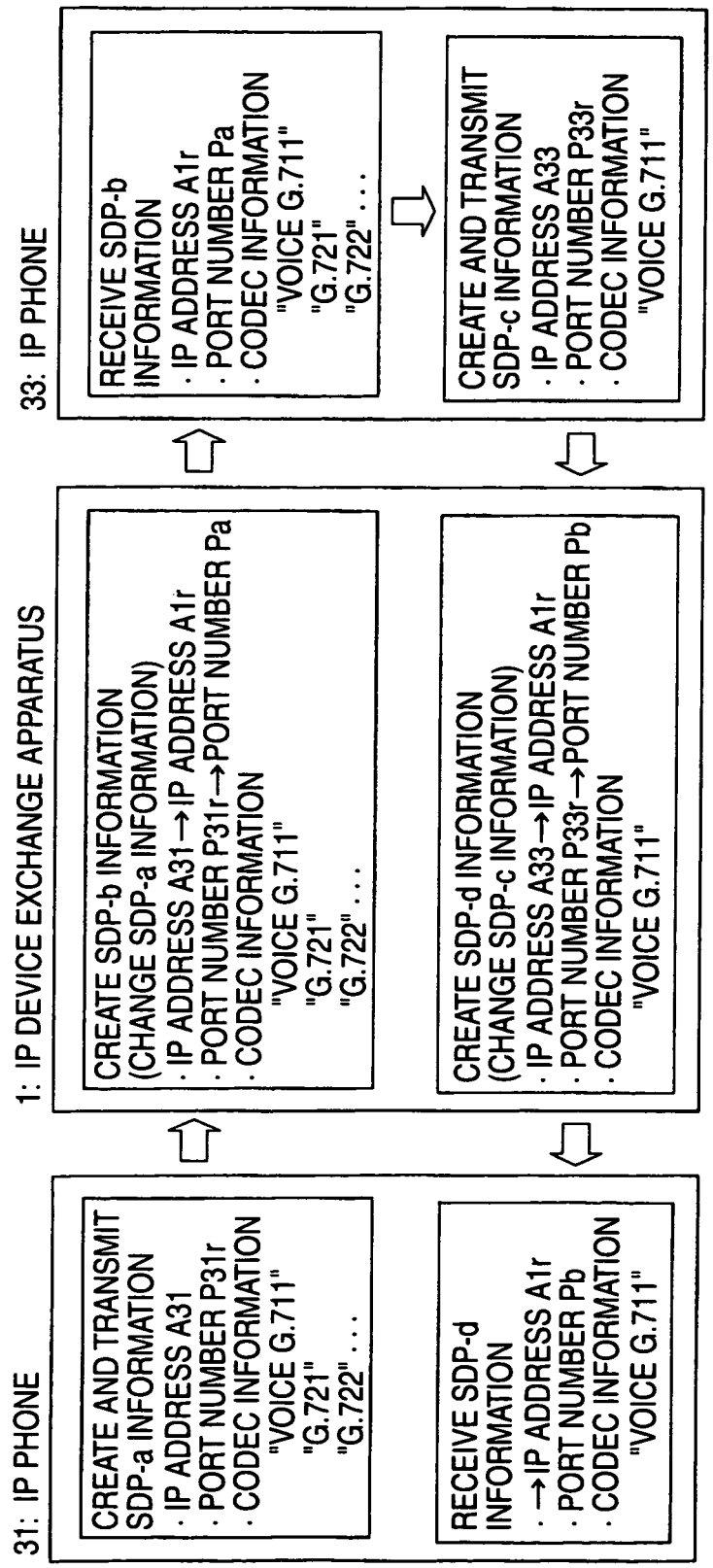
FIG. 10 is a diagram illustrating the SDP information shown in FIG. 6.
Figure 11:
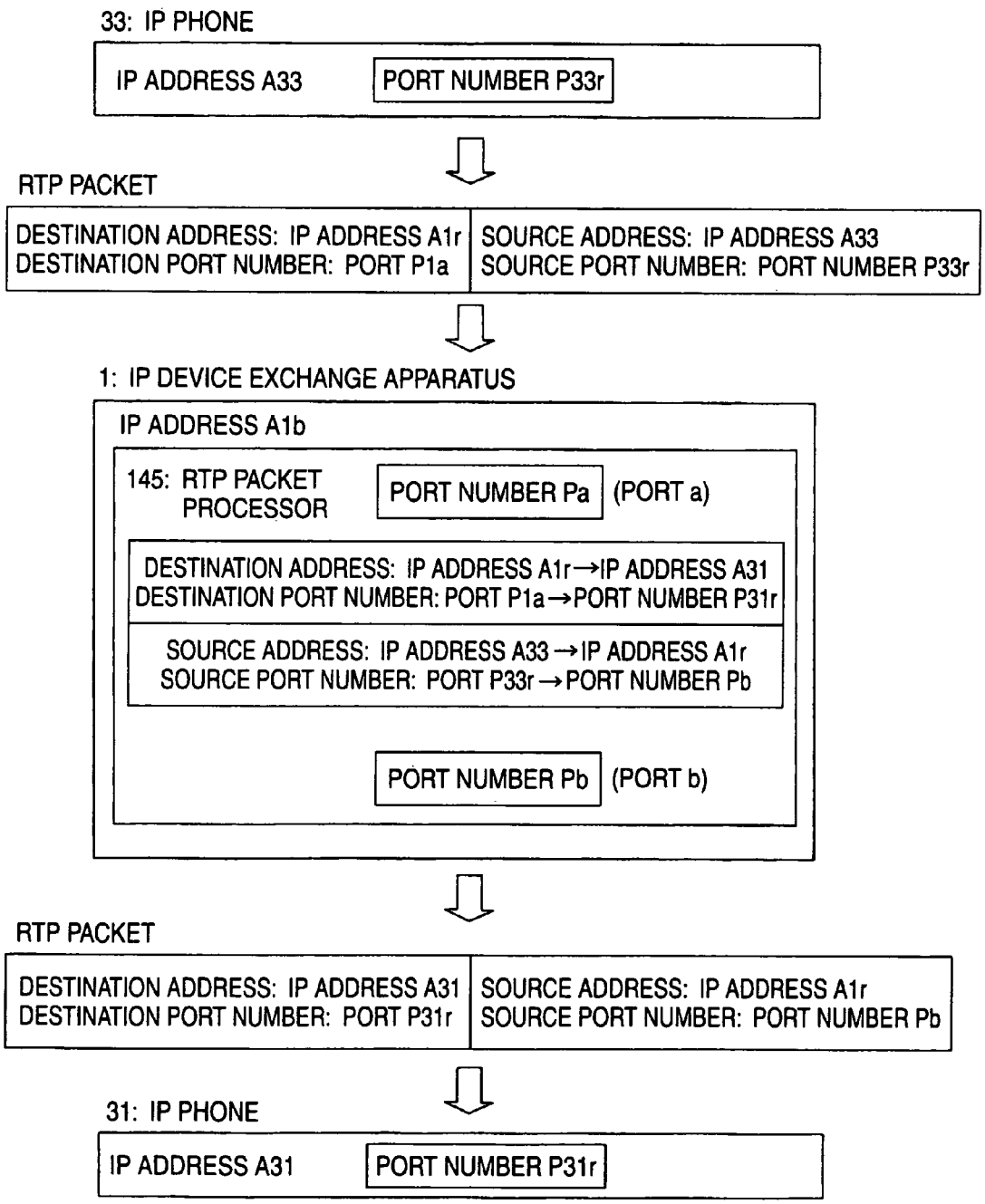
FIG. 11 is a diagram illustrating a packet changing process of an RTP packet processor shown in FIG. 7.
Figure 12:
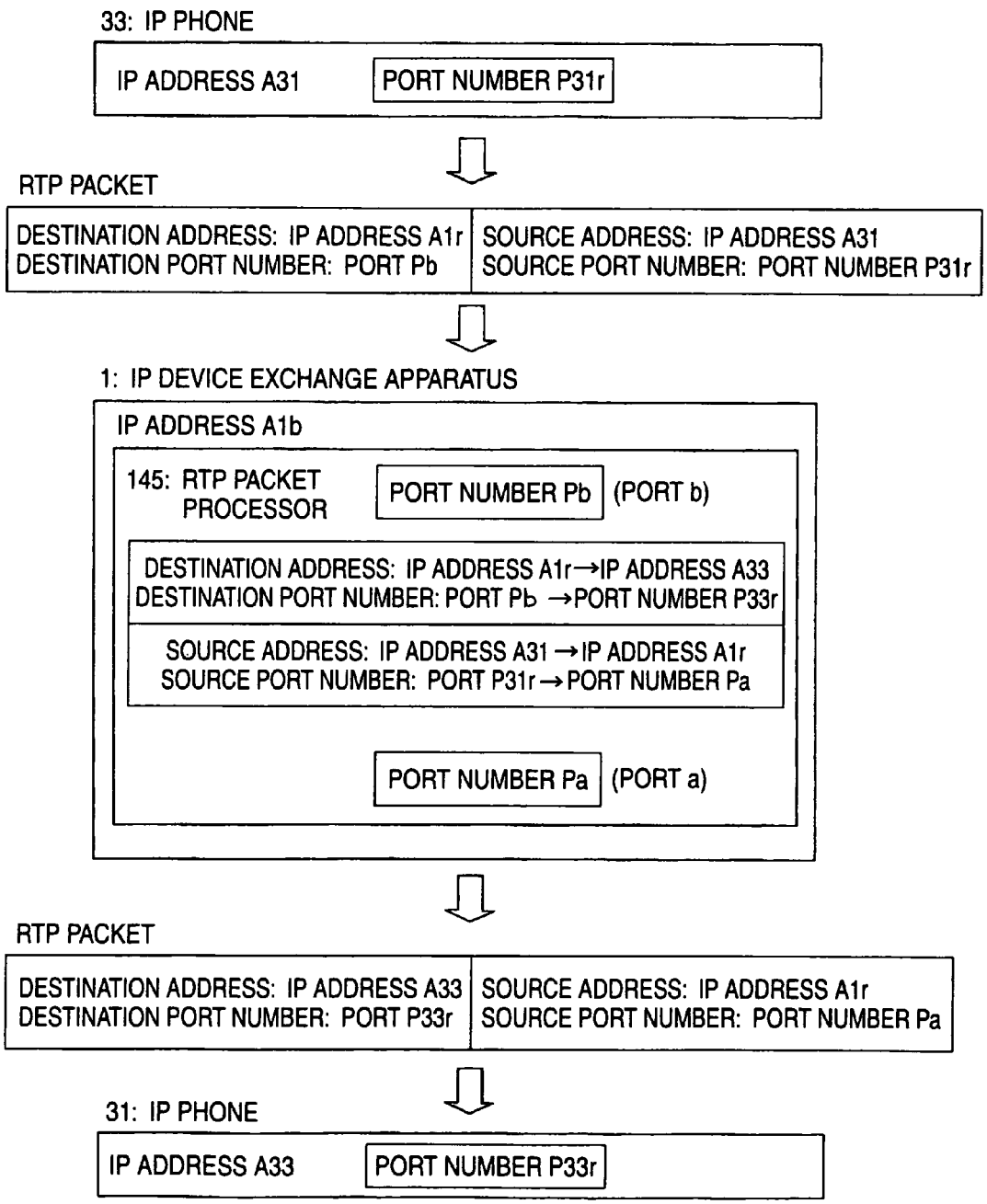
FIG. 12 is a diagram illustrating the packet changing process of the RTP packet processor shown in FIG. 7.
Figure 13:
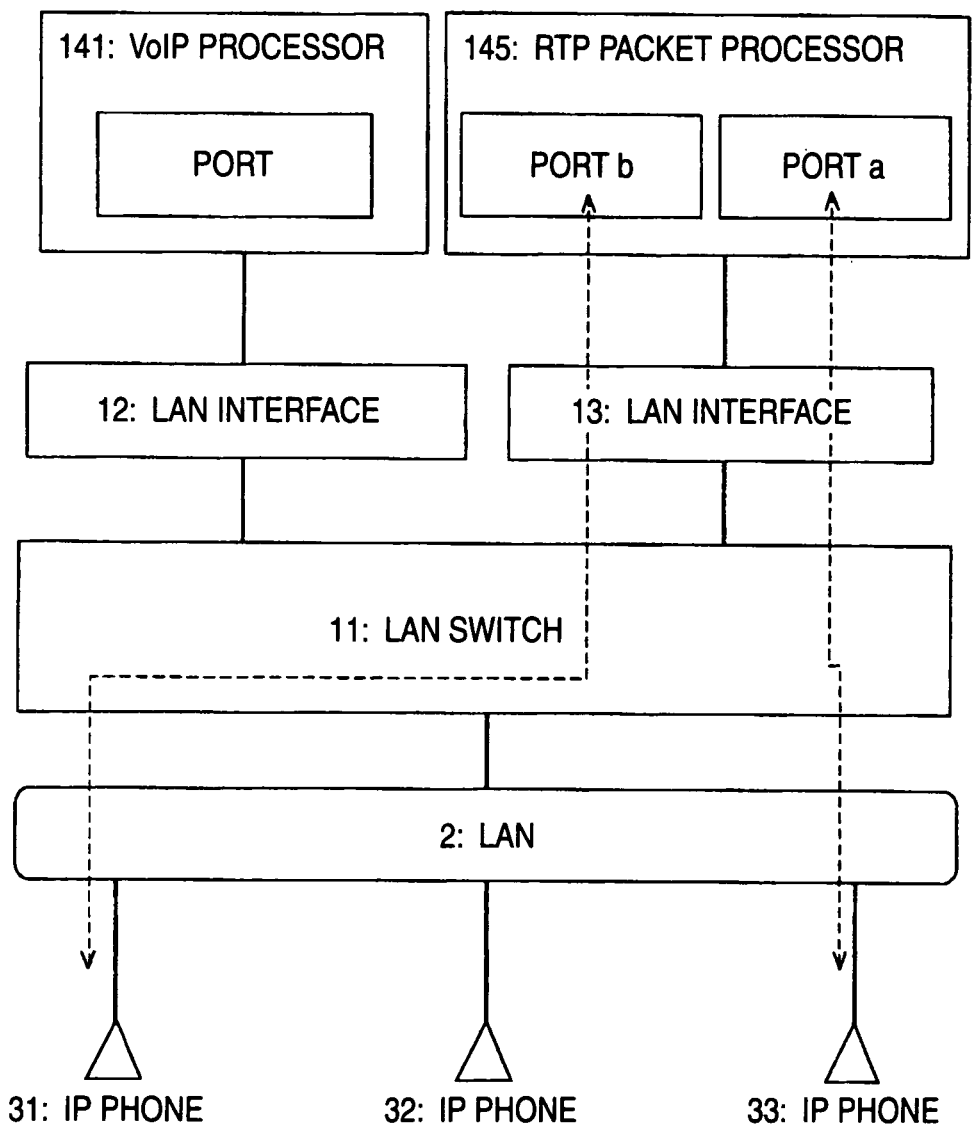
FIG. 13 is a diagram illustrating a path for changing RTP packets shown in FIG. 6.
Figure 14:
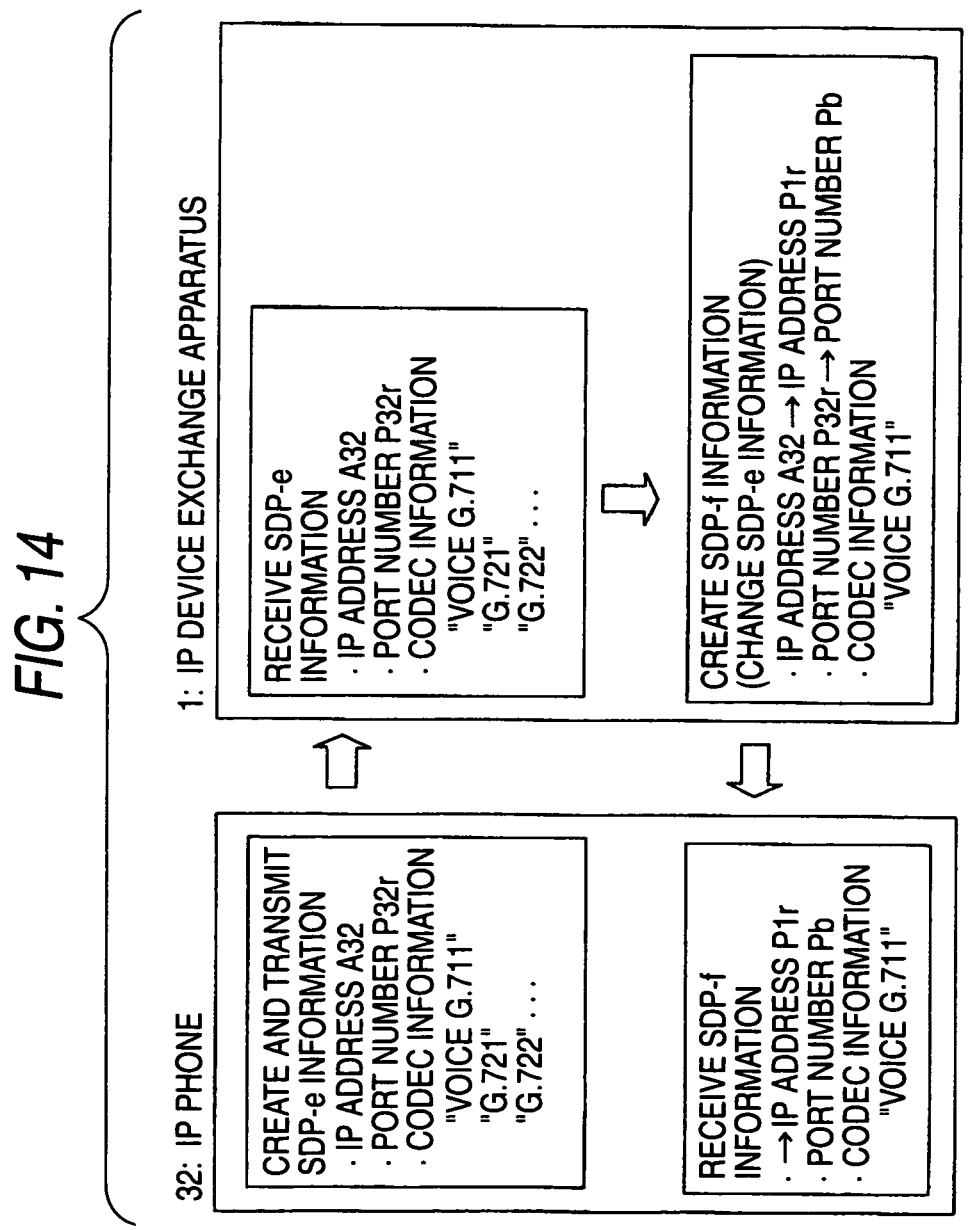
FIG. 14 is a diagram illustrating the SDP information shown in FIG. 6.
Figure 15:
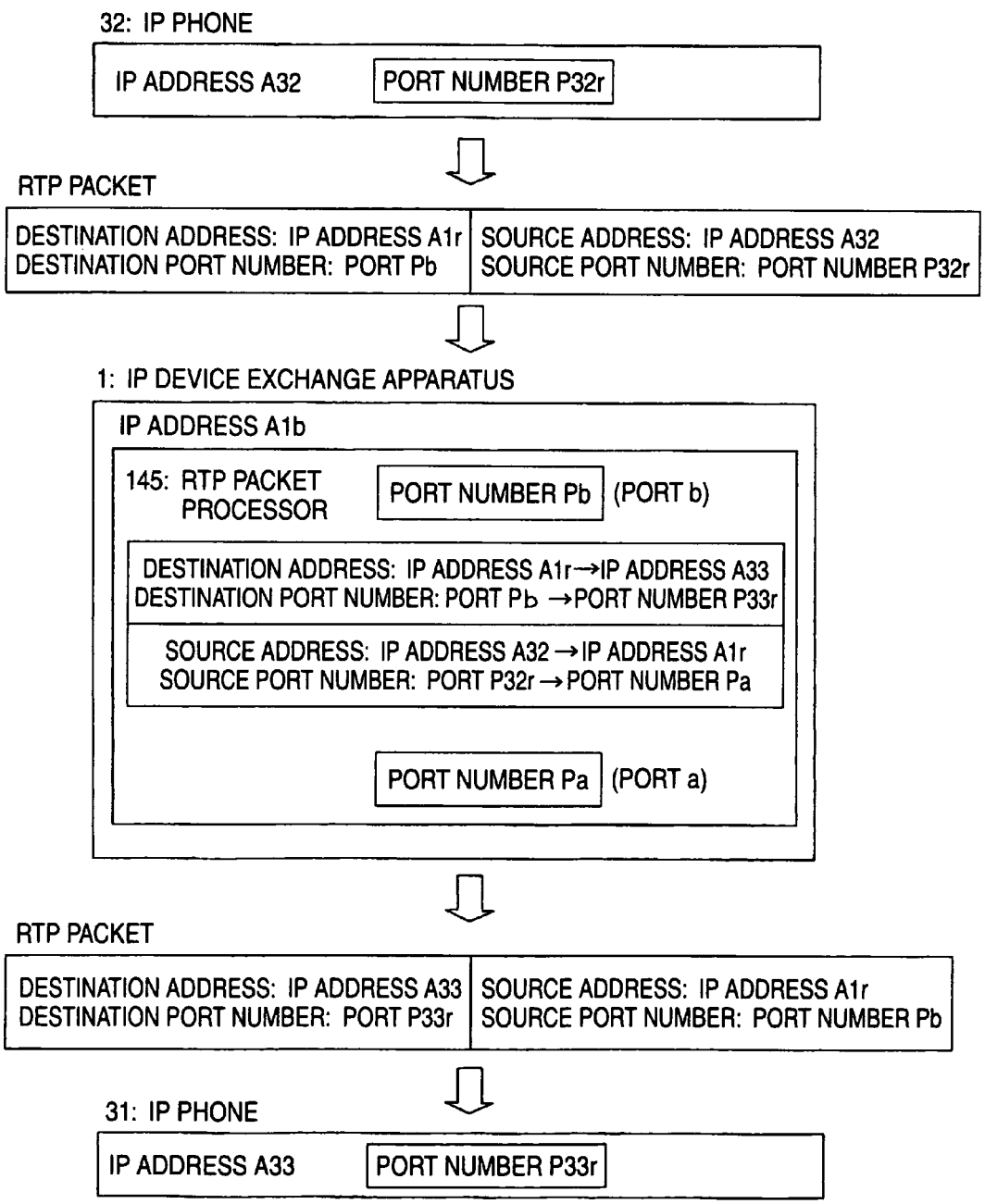
FIG. 15 is a diagram illustrating the packet changing process of the RTP packet processor shown in FIG. 13.
Figure 16:
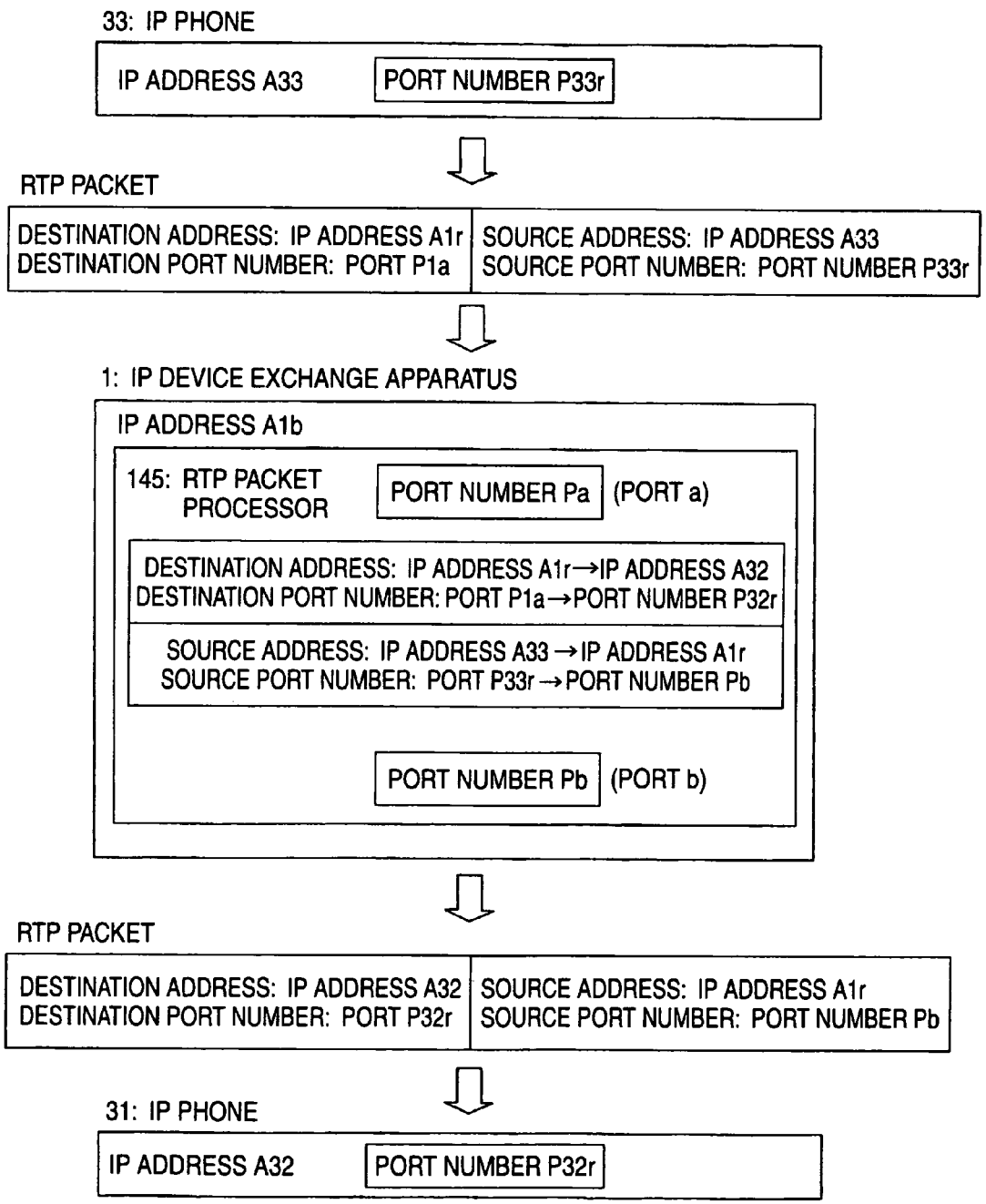
FIG. 16 is a diagram illustrating the packet changing process of the RTP packet processor shown in FIG. 13.
Figure 17:
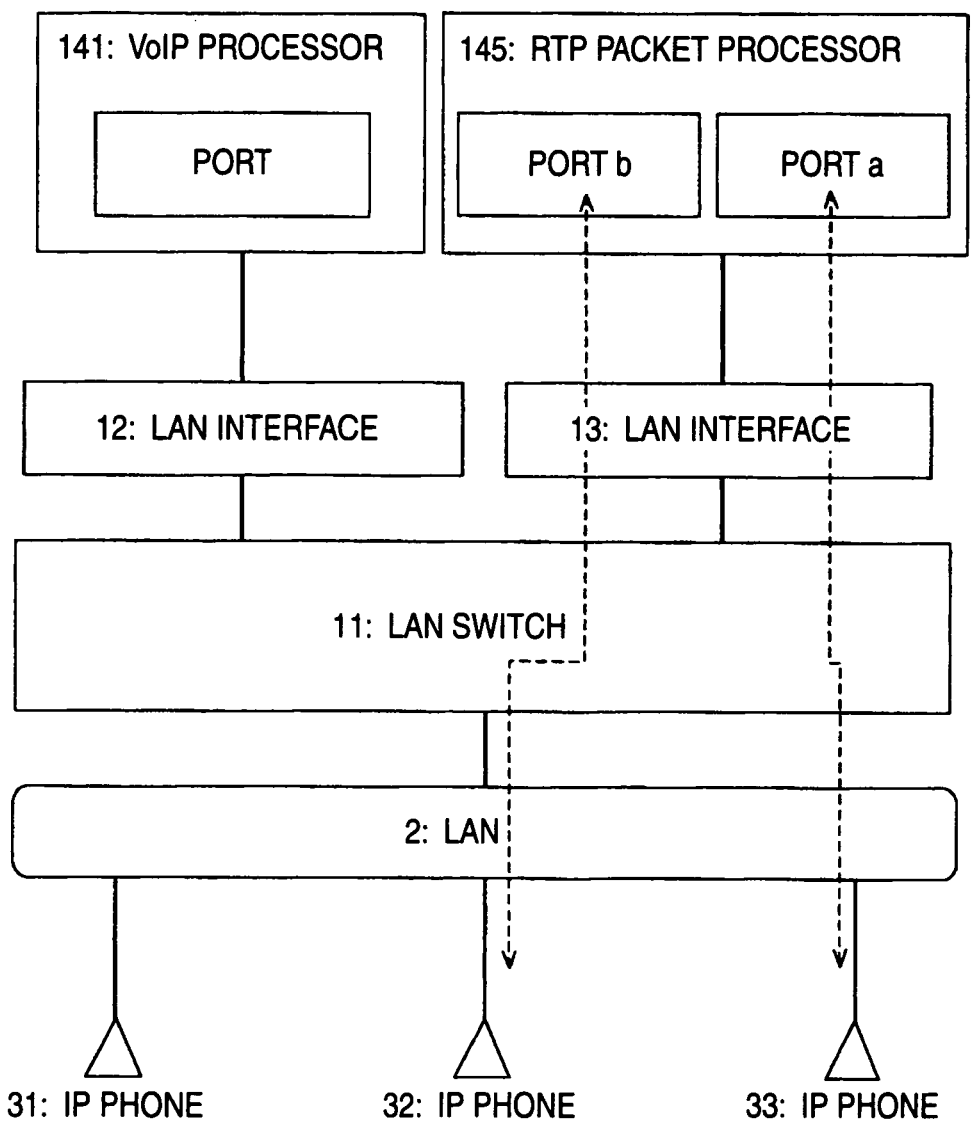
FIG. 17 is a diagram illustrating an RTP packet changing path between IP phones.

The operation of the IP changing system having the above-mentioned structure according to this embodiment will be described with reference to FIGS. 6 to 17. FIG. 6 is a sequence chart illustrating the operation of the system shown in FIG. 1. FIG. 7 is a diagram illustrating the path of the message shown in FIG. 6. FIG. 8 is a diagram illustrating an example of SDP information shown in FIG. 6. FIG. 9 is a flowchart illustrating a judging operation of the connection judging unit shown in FIG. 1. FIG. 10 is a diagram illustrating the SDP information shown in FIG. 6. FIGS. 11 and 12 are diagrams illustrating the packet changing operation of the RTP packet processor shown in FIG. 7. FIG. 13 is a diagram illustrating a path for changing the RTP packets shown in FIG. 6. FIG. 14 is a diagram illustrating the SDP information shown in FIG. 6. FIGS. 15 and 16 are diagrams illustrating the packet changing operation of the RTP packet processor shown in FIG. 13. FIG. 17 is a diagram illustrating a path for changing RTP packets between the IP phones.

In FIG. 6, reference numerals 141$a$ to 141$c$ denote tasks generated by the VoIP processor 141, and the tasks are referred to as VoIP tasks 141$a$ to 141$c$. In addition, reference numerals 142$a$ to 142$c$ denote tasks generated by the call controller 142, and the tasks are referred to as call control tasks 142$a$ to 142$c$. The VoIP tasks 141$a$ to 141$c$ and the call control tasks 142$a$ to 142$c$ are generated so as to correspond to the IP phones that communicate with the IP device exchange apparatus 1.

First, an operation of establishing a session between the IP phone 31, which is a first phone, and the IP phone 33, which is a second phone, when the IP phone 31 transmits a call will be described. In general, the sessions between the IP phones include a session for a message and a session for RTP. However, in this embodiment, a session for changing RTP packets between the IP phones will be described as an example of the session established between the IP phones.

As shown in FIG. 6, when the IP phone 31 is operated to transmit a signal to the IP phone 33, the IP phone 31 transmits an INVITE message of an SIP indicating the transmission of signals according to the SIP through the LAN interface 12 (Sequence SQ1). As shown in FIG. 5, the INVITE message has an IP address A1$m$ indicating that a destination is the VoIP processor 141 of the IP device exchange apparatus 1 and a port number P1$m$. A path through which the VoIP processor 141 transmits or receives messages based on VoIP to or from the IP phones 31 is shown as a path 31$a$ in FIG. 7.

The INVITE message includes SDP information, which is session information required to establish a session for changing RTP packets between the IP phone 31 and the IP phone 33.

An example of the SDP information is shown in FIG. 8. The SDP information includes destination information indicating the IP address and the port number of the IP phone and codec information (coded information) indicating the payload type of the RTP packet, in order to notify a communication partner of the destination of the RTP packet.

Specifically, the SDP information transmitted by the IP phone 31 includes, as the destination information, the IP address A31, the port number P31$r$, and the codec information of the IP phone 31. In this embodiment, it is assumed that the IP phone 31 supports a plurality of coding schemes, such as 'voice G.711', 'G721', 'G722', and 'F.728'. In addition, the SDP information included in the INVITE message transmitted by the IP phone 31 is shown as SDP-A information in FIG. 6.

The VoIP processor 141 receiving the INVITE message generates the VoIP task 141$a$. Then, the VoIP task 141$a$ converts the INVITE message into a Setup message by a call control signal of the IP device exchange apparatus 1, and transmits the converted message to the call controller 142. In addition, when receiving the INVITE message, the VoIP task 141$a$ transmits a 100 Trying message indicating that the message is being processed to the IP phone 31 (Sequence SQ2). When the VoIP task 141$a$ converts the INVITE message into the Setup message, the SDP-a information included in the INVITE message is inserted into the Setup message.

When receiving the Setup message, the call controller 142 generates the call control task 142$a$. Then, as shown in FIG. 9, the generated call control task 142$a$ allows the connection judging unit 143 to judge the connection of the IP phone 31 (Step S10). The judge is performed on the basis of the session change enable/disable table of the memory 15 (Step S20).

First, the enable/disable information of the session change enable/disable table corresponding to the IP phone 31 is 'enable' indicating that the IP phone can change the session (information at the address [0] in FIG. 2A). Therefore, the connection judging unit 143 judges that the connection of the IP phone 31 does not need the function of the RTP packet processor 145 (Step S30), and responds to the call control task 142$a$ (Step S70).

The call control task 142$a$ receiving the judge result transmits the Setup message including the SDP-a information to the call control task 142$c$ that is generated to manage the IP phone 33, which is a destination, without requesting the allocation of a port to the resource manager 144, which will be described below (Sequence SQ3).

When receiving the Setup message, the call control task 142c performs a message receiving process on the IP phone 33. First, the call control task 142c allows the connection judging unit 143 to judge the connection of the IP phone 33, similar to the call control task 142a (Step S10). The connection judging unit 143 judges the connection type on the basis of the enable/disable information of the session change enable/disable table corresponding to the IP phone 33 (Step S20), The enable/disable information is 'disable' indicating that the IP phone cannot change the session (information at the address [2] in FIG. 2A). Therefore, the connection judging unit 143 judges that the connection of the IP phone 33 needs the function of the RTP packet processor 145 (Step S30).

Then, the connection judging unit 143 refers to the medium information table using medium information included in the SDP-a information as type information (Step S40). Then, the connection judging unit 143 judges whether the function of the RTP packet processor 145 is needed on the basis of the condition information according to the reference result of the medium information table (Step S50). In this embodiment, since the medium information is voice data (see the address [0] in FIG. 3), the connection judging unit 143 judges that the function of the RTP packet processor 145 is needed.

Then, the connection judging unit 143 performs the judge on the basis of version information included in the SDP-a information (Step S60). When a version indicated by the version information is lower than a predetermined version that can change the session at an arbitrary timing while the IP phone is busy, the connection judging unit 143 judges that the function of the RTP packet processor 145 is needed.

In this way, the connection judging unit 143 transmits the judge result that the function of the RTP packet processor 145 is needed to the call control task 142c (Step S70).

Further, in this embodiment, the connection judging unit 143 performs the judge on the basis of the session change enable/disable table, the medium information table, and the version information. However, the connection judging unit 143 may perform the judge on the basis of only the session change enable/disable table.

The call control task 142c receiving the judge result transmits a port acquisition request to the resource manager 144 in order to acquire the port managed by the resource manager 144.

The resource manager 144 performs a resource securing step of judging whether there is an empty port with reference to the port management table stored in the memory 15 and acquiring the port, in response to the port acquisition request. For example, for the ports a and b, when a port corresponding to the address [0] of the port management table is empty (see FIG. 4A), the resource manager 144 notifies the port number to the call control task 142c. In this embodiment, it is assumed that a port number that can be allocated as the port a is a port number Pa and a port number that can be allocated as the port b is a port number Pb.

When the port is allocated, as shown in FIG. 4B, the resource manager 144 stores, in an area of the address [0] corresponding to the port b, the IP address A31, the port number P31r for RTP, and 'voice G.711', which is codec information (coded information), as the device information of the IP phone 31. In addition, the resource manager 144 stores, in an area of the address [0] corresponding to the port a, 'in use' indicating that the port number Pa is being used.

The call control task 142c notifies that RTP packet processor 145 that the port number Pb is used for communication with the IP phone 31 and the port number Pa is used for communication with the IP phone 33, thereby opening the ports (port numbers Pa and Pb). The RTP packet processor 145 opens the port number Pa and the port number Pb, and waits for the reception of RTP packets from these ports.

The call control task 142c replaces the IP address A31 and the port number P31 of the IP phone 31 with the IP address Air of the RTP packet processor and the port number Pa allocated as the port a to the RTP packet processor 145, in the destination information included in the SDP-a information transmitted from the IP phone 31, thereby obtaining SDP-b information. Then, the call control task 142c adds the SDP-b information to the Setup message and transmits the added information to the VoIP task 141c generated by the VoIP processor 141. In this case, the codec information of the SDP-b information uses the codec information (information including 'voice G.711') of the SDP-A information without any change (Sequence SQ4).

The VoIP task 141c converts the received Setup message into the INVITE message of the SIP, and transmits the INVITE message indicating the reception of a message from the port number P1m used by the VoIP processor 141 to the IP phone 33 through the LAN interface 12 (Sequence SQ5). A path through which the VoIP processor 141 transmits or receives a message based on the VoIP to or from the IP phone 33 is shown as a path 33a in FIG. 7.

When receiving the SDP-b information included in the INVITE message, the IP phone 33 sets that the destination address of the RTP packet is the IP address A1r, and the port has the port number Pa, and starts a call receiving process. First, the IP phone 33 transmits the 100 Trying message indicating that the INVITE message has reached the IP phone 33 to the LAN interface 12 of the IP device exchange apparatus 1 by designating the IP address A1m and the port number P1m (Sequence SQ6).

Since the 100 Trying message designates the IP address A1m and the port number P1m, the VoIP task 141c receiving the 100 Trying message converts the 100 Trying message into a CallProc message, which is a call control signal, and transmits the message to the call control task 142c (Sequence SQ7). The CallProc message transmitted to the call control task 142c is transmitted from the call control task 142c to the call control task 142a along a path opposite to the path of the Setup message (Sequence SQ8). Then, the CallProc message is transmitted from the call control task 142a to the VoIP task 141a (Sequence SQ9).

When the IP phone 33 rings, a 180 Ringing message indicating that a communication partner is called is transmitted to the VoIP task 141c (Sequence SQ10).

When receiving the 180 Ringing message, the VoIP task 141c converts the received message into an Alert message, which is a call control signal, and transmits the converted message to the VoIP task 141a along the same path as that through which the CallProc message is transmitted (Sequences SQ11 to SQ13). The VoIP task 141a transmits the 180 Ringing message indicating that a communication partner is called to the IP phone 31 (Sequence SQ14).

In the IP phone 33, when a receiver performs an off-hook operation to respond to the call, a 200 OK message indicating the response of the IP phone 33 is transmitted from the port number P1m used by the VoIP processor 141 (Sequence SQ15).

In this case, in Sequence SQ5, for the SDP-b information transmitted from the IP device exchange apparatus 1, SDP-c information is added to the 200 OK message, and the message is transmitted from the IP phone 33 to the IP device exchange apparatus 1.

The SDP-c information includes the IP address A33 of the IP phone 33, the port number P33 of the RTP packet transmitted from the IP phone 33, and codec information ('voice G.711'), in order to establish the session between the IP phone 33 and the IP device exchange apparatus 1. A type of codes information that can be transmitted or received by the IP phone 33 is selected from the codec information contained in the SDP-c information from the IP phone 31, thereby judging the codec information. In this embodiment, the IP phone 31 inserts 'voice G.711' as the codes information into the SDP information, and transmits the information. Therefore, since the IP phone 33 also supports the 'voice G.711', the IP phone 33 inserts the 'voice G.711' in the SDP-c information as the result of the negotiation with the IP phone 31, and transmits the information. That is, the negotiation means to select common codes information (coding scheme) to call reception and transmission.

In this way, as the result of the negotiation, a common coding scheme between the IP phones 3 is selected from a plurality of coding schemes to set a call. Therefore, it is possible to widen the selection of the IP phone that can change the session.

When receiving the 200 OK message, the VoIP task 141c converts the received message into a Connect message, which is a call control signal, and transmits the converted message to the call control task 142c. The call control task 142c transmits an ACK message corresponding to the 200 OK message to the IP phone 33 (Sequence SQ16).

When receiving the Connect message, the call control task 142c reads, from the SDP-c information, the IP address A33 of the IP phone 33, the port number P32r of the port from which the IP phone 33 transmits or receives packets according to the RTP, and codec information ('voice G.711'), and transmits the read information to the resource manager 144. As shown in FIG. 4C, the resource manager 144 performs a storing step of storing, as the device information of the IP phone 33, the IP address A33, a port number P33b for RTP, and 'voice G.711' indicating the codec information in an area of the address [0] of the port management table which is allocated as the port a, instead of 'in used'.

Further, the call control task 142c creates SDP-d information including the IP address A1r of the RTP packet processor 145 that communicates with the IP phone 31, which is included in the SDP-c information from the IP phone 33, the port number Pb that is allocated as the port b for transmitting or receiving RTP packets to or from the IP phone 31, and codec information ('voice G.711'). Then, the call control task 142c adds the SDP-D information to the Connect message, and transmits the message to the call control task 142a (Sequence SQ17). Then, the call control task 142c starts the packet changing operation of the RTP packet processor 145 (an operation of changing the port number and the IP address of the RTP packet).

The call control task 142a receiving the Connect message transmits the Connect message to the VoIP task 141a (Sequence SQ18). The VoIP task 141a converts the Connect message into the 200 OK message, and transmits the converted message to the IP phone 31, thereby setting a call (Sequence SQ19). That is, the call setting means a series of processes of selecting common codec information (coding scheme) to call transmission and reception, negotiating the selected information, and changing the IP addresses and the port numbers of the source and the destination of the communication packets.

Then, the IP phone 31 receiving the 200 OK message transmits an ACK message, which is a response message, to the VoIP task 141a (Sequence SQ20). When receiving the SDP-d information, the IP phone 31 sets the destination address of the RTP packet to the IP address A1r, set the port number Pa to the port, and starts a call receiving operation.

As shown in FIG. 10, the IP device exchange apparatus 1 changes the SDP-a information received from the IP phone 31 such that the IP address and the port number of the IP phone 31 are changed to those of the IP device exchange apparatus 1 (RTP packet processor 145) without changing the codec information, and transmits the information to the IP phone 33. In this way, the destination of the RTP packet for the IP phone 33 becomes the IP device exchange apparatus 1. Similarly, the IP device exchange apparatus 1 changes the SDP-c information received from the IP phone 33 such that the IP address and the port number of the IP phone 33 are changed to those of the IP device exchange apparatus 1 (RTP packet processor 145) without changing the codec information, and transmits the information to the IP phone 31. In this way, the destination of the RTP packet for the IP phone 31 becomes the IP device exchange apparatus 1.

When the sessions are established between the IP device exchange apparatus 1 and the IP phones 31 and 33, a call starts (Sequence SQ21). The call is performed by RTP packets. The RTP packets are switched by the RTP packet processor 145. In the packet changing process, the header of the RTP packet transmitted from the IP phone 31 is changed such that the IP device exchange apparatus 1 can transmit the RTP packet, and then transmitted to the IP phone 33. In contrast, the header of the RTP packet transmitted from the IP phone 33 is changed such that the IP device exchange apparatus 1 can transmit the RTP packet, and then transmitted to the IP phone 31.

Next, the packet changing process performed by the RTP packet processor 145 will be described in detail with reference to FIGS. 11 and 12. As shown in FIG. 11, the RTP packet transmitted from the IP phone 33 to the RTP packet processor 145 is generated on the basis of the SDP-b information. Therefore, a destination address is set to the IP address A1 indicating the RTP packet processor 145 of the IP device exchange apparatus 1, and a destination port is set to the port number Pa indicating the port a. In addition, a source address is set to the IP address A33 indicating the IP phone 33, and a source port is set to the port number P33r of the IP phone 33.

Therefore, the RTP packet processor 145 changes the destination address of the RTP packet from the IP phone 33 to the IP address A31 of the IP phone 31, and changes the destination port to the port number P31r of the IP phone 31. Further, the RTP packet processor 145 changes the source address to the IP address A1r indicating the RTP packet processor 145, and changes the source port to the port number Pb indicating the port b. In this way, the RTP packet from the IP phone 33 seems to be transmitted from the IP device exchange apparatus 1. The changed RTP packet is transmitted to the IP phone 31 through the LAN interface 13 by the RTP packet processor 145.

The header of the RTP packet transmitted from the IP phone 31 to the RTP packet processor 145 is generated on the basis of the SDP-d information. Therefore, as shown in FIG. 12, a destination address is set to the IP address A1r indicating the RTP packet processor 145 of the IP device exchange apparatus 1, and a destination port is set to the port number Pb indicating the port b. In addition, a source address is set to the IP address A31 indicating the IP phone 31, and a source port is set to the port number P31r of the IP phone 31.

Therefore, the RTP packet processor 145 changes the destination address to the IP address A33 indicating the IP phone 33, and changes the destination port to the port number P33r of the IP phone 33. Further, the RTP packet processor 145 changes the source address to the IP address Air indicating the RTP packet processor 145, and changes the source port to the port number Pa indicating the port a. In this way, the RTP packet from the IP phone 31 seems to be transmitted from the IP device exchange apparatus 1. The changed RTP packet is transmitted to the IP phone 33 through the LAN interface 13 by the RTP packet processor 145.

As described above, the RTP packet processing changes the source of the packet transmitted from an IP phone to the address of the IP device exchange apparatus, thereby changing the destination and the source. Therefore, it is possible to perform call changing. As such, as shown in FIG. 13, the RTP packet processor 145 is interposed between the IP phone 31 and the IP phone 33 to change the header of an RTP packet (an IP address and a port number). In this way, it is possible to maintain the same communication as Peer-to-Peer communication.

<Call Steal>

Next, an example of a 'call steal' meaning a change in communication partner during a call will be described. For example, when the third phone (IP phone 32) transmits a request to communicate with the second phone (IP phone 33) to the IP device exchange apparatus 1 while the first phone (IP phone 31) communicates with the second phone (IP phone 33), the 'call steal' is performed to start communication between the third phone (IP phone 32) and the second phone (IP phone 33), which will be described below.

As shown in FIG. 6, an operator inputs to the IP phone 32 a feature number for requesting the call steal of the IP phone 31 (a call instruction step). The IP phone 32 transmits to the VoIP processor 141 the INVITE message, which is a call instruction including the feature number and SDP-e information, which is the SDP information of the IP phone 32 (Sequence SQ22).

The feature number input in the call instruction step is reflected in the content of parameters in the INVITE message. For example, in FIG. 8, the feature number is reflected in a value '101' of a 'To (where)' instruction row. A path through which the VoIP processor 141 transmits or receives a message based on VoIP to or from the IP phone 32 is shown as a path 32a in FIG. 7.

The SDP-e information includes destination information indicating the IP address A32 of the IP phone 32 and a port number P32r for RTP, and codes information indicating the payload type of RTP packets that can be transmitted or received by the IP phone 32. In this embodiment, it is assumed that the IP phone 32 supports a plurality of coding schemes including 'voice G.711' in the codec information.

In the IP device exchange apparatus 1 receiving the INVITE message, the INVITE message is converted into the Setup message by the VoIP task 141b generated by the VoIP processor 141, and then transmitted to the call controller 142 (Sequence SQ23).

In the call controller 142, the generated call task 142b analyzes the INVITE message. The content of the parameters in the INVITE message is analyzed. In this case, the call task 142b analyzes whether the feature number is reflected in the content. As the analysis result of the INVITE message, the call control task 142b judges that there is a call instruction for the set communication partner number to steal the call of the IP phone 31 and to request communication with the IP phone 33. The call control task 142b transmits a message for inquiring an intended party to the call control task 142a that manages the call of the IP phone 31 (Sequence SQ24).

The call control task 142a receiving the inquired message transmits to the call control task 142b information indicating that the intended party is the IP phone 33 (Sequence SQ25).

When receiving the information indicating that the intended party is the IP phone 33, the call control task 142b transmits information indicating call steal and the Setup message including the SDP-e information to the call control task 142c (Sequence SQ26).

The call control task 142c transmits a Release message that means the recovery of disconnection to the call control task 142a in order to cut call connection to the IP phone 31 due to the call steal (Sequence SQ27).

The call control task 142a receiving the Release message transmits the Release message to the VoIP task 141a (Sequence SQ28). Then, the VoIP task 141a converts the received Release message into a BYE message indicating the disconnection recovery, and transmits the converted message to the IP phone 31 (Sequence SQ29). The IP phone 31 can maintain communication with the IP phone 33 until the BYE message is received.

The IP phone 31 receiving the BYE message transmits the 200 OK message indicating a response to the VoIP task 141a (Sequence SQ30).

In Sequence SQ26, the connection judging unit 143 judges that the call control task 142c receiving the Setup message is controlling the IP phone 33 that cannot change the session at an arbitrary timing while the IP phone 33 is busy (connection judging step) (see SQ3 and SQ4 in FIG. 6 and S30 in FIG. 9). Therefore, the call control task 142c judges that a control process of changing a calling party that communicates with the IP phone 33 along the sequence defined by the VoIP is not performed.

That is, the call control task 142c judges that a change in calling party by the call steal is performed by a control process performed by the port b, not by a control process of changing the session between the IP phone 33 and the port a (port number Pa) of the RTP packet processor 145, which has already been set to the IP phone 33.

First, the call control task 142c reads out destination information and codec information from the SDP-e information received by the IP phone 32. That is, the call control task 142c reads out the IP address A32 of the IP phone 32, the port number P32 capable of transmitting or receiving RTP packets, and 'voice G.711' and the other codec information of the RTP packet that can be transmitted or received by the IP phone 32. Then, the call control task 142c reads the codes information used between the IP phone 31 and the IP phone 33 that communicate with each other, with reference to the change enable/disable table stored in the memory 15. In this way, it is possible to check that the codec information used between the IP phone 31 and the IP phone 33 is 'voice G.711'. As the result of the negotiation, 'voice G.711' is selected.

Then, the call control task 142c creates SDP-f information in which 'voice G.711' is used as codec information, using the IP address A1r of the RTP packet processor 145 and the port number Pb that is allocated as the port b as the destination information. Then, the call control task 142c adds the SDP-f information to the Connect message, and transmits the message to the call control task 142b (Sequence SQ31). That is, the call control task 142c serves as a call setting processor that changes the destination of the RTP packet to the IP address A1r, and negotiates the destination during a call setting process, thereby setting the IP phones 31 and 33 such that RTP packets are transmitted to the RTP packet processor 145.

The call control task 142c notifies the resource manager 144 that the IP phone using the port number Pb is changed from the IP phone 31 to the IP phone 32. That is, the call control task 142c transmits to the resource manager 144 the port number Pb, the IP address A32 of the IP phone 32, the port number P32r, and the codec information 'voice G.711'. As shown in FIG. 4D, the resource manager 144 stores the device information of the IP phone 32 in the port management table as management information, instead of the device information of the IP phone 31.

Then, the call control task 142c restarts the packet changing process of the RTP packet processor 145 (a process of changing the port number and the IP address of the RTP packet) to enable RTP packets to communicate between the IP phone 33 and the IP phone 32.

Thereafter, the call control task 142b transmits the Connect message to the VoIP task 141b (Sequence SQ32). The VoIP task 141b receiving the Connect message transmits the 200 OK message including the SDP-f information created by the call control task 142c to the IP phone 32, thereby performing a call setting step (Sequence SQ33). The IP phone 32 receiving the 200 OK message transmits the ACK message indicating a response to the VoIP task 141b (Sequence SQ34).

As shown in FIG. 14, the IP device exchange apparatus 1 does not change the codec information contained in the SDP-e information transmitted from the IP phone 32, but modifies the IP address and the port number of the IP phone 32 contained in the SDP-e information to the IP address and the port number of the IP device exchange apparatus 1 (the address of the RTP packet processor 145. That is, since the address is of the IP device exchange apparatus, the address is referred to as an own address). Then, the IP device exchange apparatus 1 returns the SDP-e information to the IP phone 32. In this way, the destination of the RTP packet from the IP phone 32 can be set to the IP device exchange apparatus 1.

When a session is established between the IP device exchange apparatus 1 and the IP phone 32, a call changing step is performed to start a call therebetween (Sequence SQ35). In general, the call changing step is performed by RTP packets, and the RTP packets are switched by the RTP packet processor 145. In the packet changing process, the header of the RTP packet transmitted from the IP phone 32 is changed such that the IP device exchange apparatus 1 can transmit the RTP packet, and the RTP packet is transmitted to the IP phone 33. On the contrary, the header of the RTP packet transmitted from the IP phone 33 is changed such that the IP device exchange apparatus 1 can transmit the RTP packet, and the RTP packet is transmitted to the IP phone 32.

Next, the packet changing process of the RTP packet processor 145 after the 'call steal' will be described in detail with reference to FIGS. 15 and 16.

As shown in FIG. 15, the header of the RTP packet transmitted from the IP phone 32 to the RTP packet processor 145 is generated on the basis of the SDP-d information (see FIG. 10). Therefore, a destination address is set to the IP address A1r indicating the RTP packet processor 145 of the IP device exchange apparatus 1, and a destination port is set to the port number Pb indicating the port b. Further, a source address is set to the IP address A32 indicating the IP phone 32, and a source port is set to the port number P32r of the IP phone 32.

Therefore, the RTP packet processor 145 modifies the destination address of the RTP packet to the IP address A33 of the IP phone 33, and modifies the destination port to the port number P33r of the IP phone 33. Further, the RTP packet processor 145 modifies the source address to the IP address A1r indicating the RTP packet processor 145, and modifies the source port to the port number Pa indicating the port a. Therefore, the RTP packet from the IP phone 32 seems to be transmitted from the IP device exchange apparatus 1. The modified RTP packet is transmitted to the IP phone 33 through the LAN interface 13 by the RTP packet processor 145. In this way, the RTP packet processor 145 performs a transmission changing process (call changing step).

As shown in FIG. 16, the RTP packet transmitted from the IP phone 33 to the RTP packet processor 145 is generated on the basis of the SDP-b information (see FIG. 10). Therefore, a destination address is set to the IP address A1r indicating the RTP packet processor 145 of the IP device exchange apparatus 1, and a destination port is set to the port number Pa indicating the port a. Further, a source address is set to the IP address A33 indicating the IP phone 33, and a source port is set to the port number P33r of the IP phone 33.

Therefore, the RTP packet processor 145 modifies the destination address of the RTP packet transmitted from the IP phone 33 to the IP address A32 of the IP phone 32, and modifies the destination port to the port number P32r of the IP phone 32. Further, the RTP packet processor 145 modifies the source address to the IP address A1r indicating the RTP packet processor 145, and modifies the source port to the port number Pb indicating the port b.

Therefore, the RTP packet from the IP phone 33 seems to be transmitted from the IP device exchange apparatus 1. The changed RTP packet is transmitted to the IP phone 32 through the LAN interface 13 by the RTP packet processor 145. In this way, the RTP packet processor 145 performs a reception changing process (call changing step).

As shown in FIG. 17, the RTP packet processor 145 is interposed between the IP phone 32 and the IP phone 33 to change the header of an RTP packet (an IP address and a port number). Therefore, it is possible to achieve a 'steal' function of starting communication between the IP phone 32 and the IP phone 33 while maintaining the communication between the IP device exchange apparatus 1 and the IP phone 33.

As such, the IP device exchange apparatus 1 according to this embodiment of the invention modifies the port number and the destination address in the header of an RTP packet to the port number and the destination address of the IP device exchange apparatus, without performing direct communication (call connection) between the IP phones, thereby converting the RTP packet such that the RTP packet seems to be transmitted from a calling party. In this case, the IP device exchange apparatus 1 can intervene in communication between the IP phones.

Therefore, after a session for the RTP packets is established between the IP phones, the IP device exchange apparatus 1 can modify the destination and the source of the RTP packets without changing the session using a VoIP message. In this way, the IP device exchange apparatus 1 can change a communication partner at an arbitrary timing while maintaining the same communication as the Peer-to-Peer communication. As a result, it is possible to achieve complicated and various functions as those in a legacy PBX system.

As described above, a memory has information indicating whether each IP phone has a function of changing a call connection stored therein beforehand, and a controller judges whether each IP phone has the function of changing the call connection. In this way, it is possible to easily judge the connection of the IP phone that changes a call connection, and thus judge whether a process of changing a destination and a source using RTP packet processing is needed.

Therefore, according to the IP device exchange apparatus 1, a caller can maintain a phone call using the IP phone 3 while the call connection of the IP phone 3 is being set, and the call is switched at the time when the call connection is completely set. Thus, it is possible to make the caller feel that the call connection is instantaneously switched.

Further, in this embodiment, since the IP phone 31 can change the session, the connection of the IP phone 31 does not require the function of the RTP packet processor 145. Since the IP phone 33 cannot change the session, the connection of the IP phone 33 requires the function of the RTP packet processor 145. However, when the IP phone 32 transmitting a call request does not have a call changing function, or when the connection of the IP phone 31 and the IP phone 33 require the function of the RTP packet processor 145, it is possible to secure two sets of ports a and b.

Figure 18:
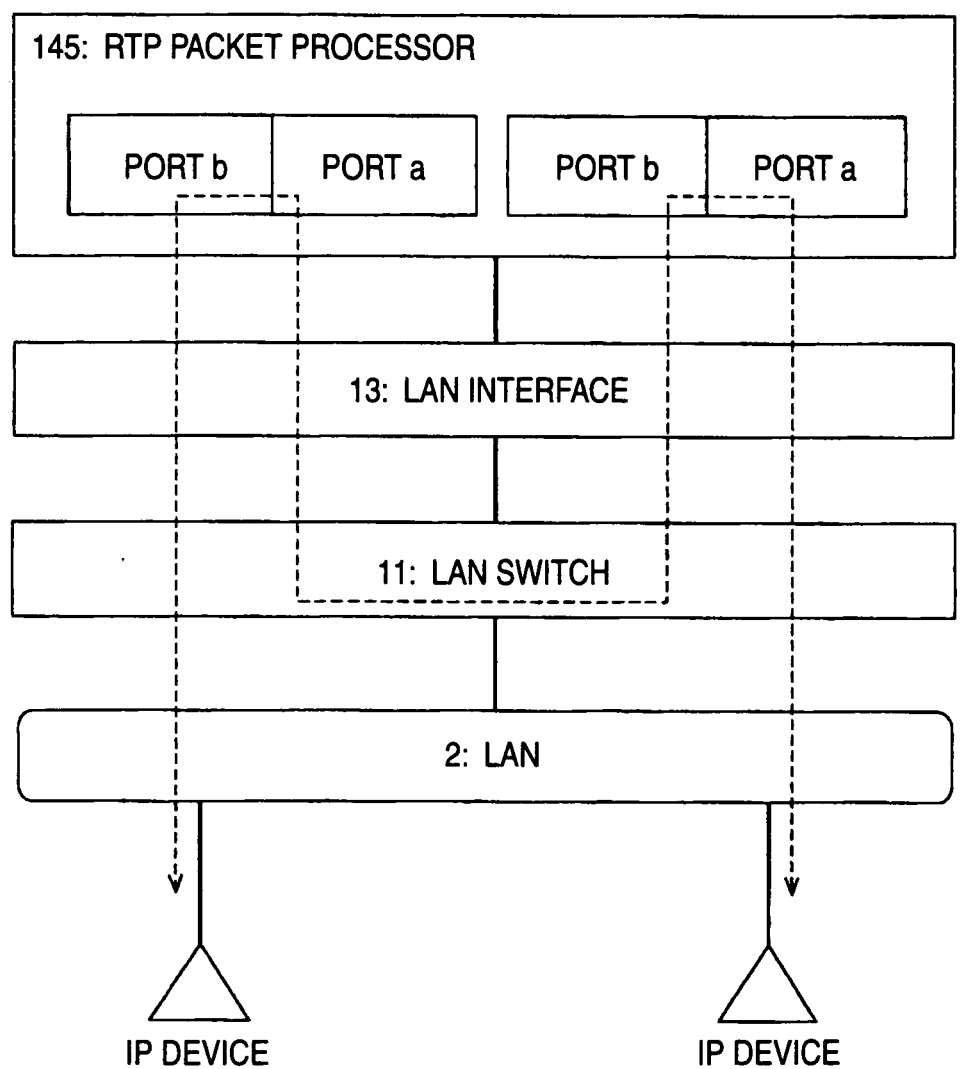
FIG. 18 is a diagram illustrating paths through which two IP phones use the RTP packet processor.

Next, a process when the connection of the IP phone 31 and the IP phone 33 require the function of the RTP packet processor 145 will be described with reference to FIG. 18. FIG. 18 is a diagram illustrating paths through which the two IP phones use the RTP packet processor.

In Sequence SQ2, the call control task 142a receiving the Setup message allows the connection judging unit 143 to judge the connection of the IP phone 31. When the connection of the IP phone 31 cannot change the session, the connection judging unit 143 notifies the call control task 142a of the fact. The call control task 142a transmits a port acquiring request to the resource manager 144 (see FIG. 1). The resource manager 144 acquires one set of ports a and b in response to the port acquiring request. That is, as shown in FIG. 18, the call control task 142a managing the IP phone 31 and the call control task 142c managing the IP phone 33 acquire two sets of ports a and b. Among the two sets of ports a and b, RTP packets are transmitted and received between the port a and the port b through the LAN switch 11 to establish the session of the RTP packet, and the destination and the source of the RTP packet can be changed without performing a session changing process using a VoIP message.

As such, when the connection of two IP phones that communicate with each other cannot change the session, a first set of ports a and b may be acquired and then a second set of ports a and b may not be acquired, instead of acquiring two sets of ports a and b, or two sets of ports a and b may be acquired and a second set of ports a and b may be released.

In this embodiment, the example in which the resource manager 144 judges whether there are empty ports a and b has been described above. However, when there are no empty ports a and b, in order to secure an emergency call to a police station or a fire station, SDP information transmitted from one IP phone is transmitted to the other IP phone without changing the content of the SDP information. Similarly, SDP information transmitted from the other IP phone is transmitted to the other IP phone without changing the content of the SDP information. In this way, it is possible to achieve Peer-to-Peer communication without using the RTP packet processor 145. Specifically, SDP-a information, which is the SDP information of the IP phone 31, is set to the Setup message transmitted from the call control task 142c to the VoIP task 141c, or the INVITE message transmitted from the VoIP task 141c to the IP phone 33. In this way, it is possible to perform SDP negotiation (call setting) in which the IP address and the port number of a calling party are set between the IP phone 31 and the IP phone 33. Therefore, it is possible to achieve Peer-to-Peer communication between the IP phone 31 and the IP phone 33 without interposing the RTP packet processor 145 therebetween.

Furthermore, in this embodiment, after the connection judging unit 143 performs judge, the resource manager 144 acquires ports. However, when the RTP packet processor 145 is used after the ports a and b are certainly acquired, the connection judging unit 143 may be omitted.

When the number of ports a and b that can be allocated is larger than that of IP phones to be connected, the resource manager 144 may be omitted. In this case, when connection judging unit 143 judges that the connection of the IP phone requires the function of the RTP packet processor 145, the call controller 142 immediately requests the RTP packet processor 145 to open the ports a and b corresponding to each IP phone.

Further, in this embodiment, the IP device exchange apparatus 1 changes call connection between the IP phone 31 and the IP phone 33, in response to a 'steal' request from the IP phone 32. However, connection changing conditions are not limited thereto. For example, the following three changing methods may be used.

(1) First, one of the IP phone 31 and the IP phone 33 initially communicating with each other (the IP phone that is disconnected due to a session change, or the IP phone that maintains connection after a session change) transmits a session changing request for changing a call destination to the IP device exchange apparatus 1. The IP device exchange apparatus 1 changes connection between the IP phone 31 and the IP phone 33 to connection between the IP phone 32 and one of the IP phone 31 and the IP phone 33, in response to the session changing request.

(2) Second, the IP device exchange apparatus 1 manages time to change call connection. For example, the call controller 142 of the IP device exchange apparatus 1 judges whether a predetermined time has elapsed after the session was established between the IP phone 31 and the IP phone 33. The IP device exchange apparatus 1 changes the connection between the IP phone 31 and the IP 33 to the connection between the IP phone 32 and one of the IP phones 31 and 33 when it is judged that the predetermined time has elapsed.

(3) Third, the connection between the IP phone 31 and the IP phone 33 that initially communicate with each other is changed to the connection between the IP phone 32 and one of the IP phones 31 and 33 by on-hook or when a transmission button is pushed. For example, the call controller 142 controls call connection such that the IP phone 31 starts a call to the IP phone 32 and the IP phone 33 is in a hold state. Then, the communication between the IP phone 31 and the IP phone 32 is finished, and the IP phone 31 turns to an on-hook state (line disconnection). When the call controller 142 of the IP device exchange apparatus 1 detects the on-hook state, the RTP packet processor 145 performs switches the RTP packets without performing a session changing process using the VoIP, in response to the on-hook, thereby changing the destination and the source of the RTP packets. That is, the IP phone 33 is connected to the IP phone 32 in the hold state.

The invention relates to an IP device exchange apparatus and a call connection changing method that transmit or receive voice data to control the connection between IP phones communicating with each other. In addition, the invention is useful for an IP device exchange apparatus that switches voice data of IP phones that require voice deterioration. In particular, the invention is suitable for a technique for achieving a function of changing a calling party during communication.

According to the invention, similar to communication between extension telephones to the related art of time divisional PBX, it is possible to achieve a call changing function between IP phones. In addition, it is possible to perform call changing while maintaining community of coding methods. Therefore, even when an IP phone is used, a caller can maintain a call during call setting. In addition, since call changing is performed after call setting is completed, it is possible to make the caller feel that call changing is instantaneously performed.

This application is based upon and claims the benefit of priority of Japanese Patent Application No. 2007-165813 filed on Jun. 25, 2007, the contents of which are incorporated herein by reference in its entirety.

What is claimed is:

1. An IP device exchange apparatus, comprising:
a connector that is connectable to a plurality of IP phones, including a first IP phone and a second IP phone;
a memory configured to store a coding scheme obtained through a negotiation to establish a call between the plurality of IP phones, and to store session change enable/disable information, indicating whether or not each of the plurality of IP phones is capable of changing sessions;
a RTP packet processor configured to switch RTP packets between the IP phones communicating with each other; and
a controller configured to, when receiving a call instruction for a call connection between the first IP phone and the second IP phone of the plurality of IP phones while neither the first IP phone nor the second IP phone is involved in a call, employ the coding scheme stored in the memory, and judge whether the RTP packet processor is needed on the basis of the session change enable/disable information of the first IP phone and the second IP phone,
wherein when the RTP packet processor is judged to be needed, the first IP phone and the second IP phone communicate with each other by transferring the RTP packets via the RTP packet processor within the IP device exchange apparatus, and
wherein when the RTP packet processor is judged not to be needed, the first IP phone and the second IP phone communicate with each other without using the RTP packet processor.

2. The IP device exchange apparatus according to claim 1, wherein
the connector is connected to the first IP phone, the second IP phone, and a third IP phone of the plurality of IP phones;
the memory stores the coding scheme obtained by call setting which is negotiated between the first IP phone and the second IP phone, and
the controller that, when receiving a first call instruction for a call connection to the second IP phone from the third IP phone during RTP packet communication between the first IP phone and the second IP phone via the RTP packet processor, employs the coding scheme stored in the memory to perform, between the third IP phone and the IP device exchange apparatus, call setting between the second IP phone and the third IP phone, while maintaining the call connection between the first IP phone and the second IP phone, thereby changing the call connection between the first IP phone and the second IP phone to the call connection between the second IP phone and the third IP phone by transmitting RTP packets via the RTP packet processor.

3. The IP device exchange apparatus according to claim 2, wherein the controller selects a coding scheme in common with the coding scheme stored in the memory among a plurality of coding schemes of the third IP phone that is contained in the first call instruction.

4. The IP device exchange apparatus according to claim 2, wherein when changing the call connection between the first IP phone and the second IP phone to the second IP phone and the third IP phone, the controller modifies a source of a packet transmitted from the second IP phone to an address of the IP device exchange apparatus, a destination of the packet transmitted from the second IP phone to an address of the third IP phone, a source of a packet transmitted from the third IP phone to the address of the IP device exchange apparatus, and a destination of the packet transmitted from the third IP phone to an address of the second IP phone.

5. The IP device exchange apparatus according to claim 1, wherein the memory further stores medium information, in which condition information, indicating whether a session change is needed, is associated with a type of medium, the type of medium including at least audio data and image data; and
the controller judges whether the function of the RTP packet processor is needed on the basis of the medium information.

6. The IP device exchange apparatus according to claim 5, wherein when the call instruction is received, the controller judges whether one of the first IP phone and the second IP phone is capable of changing sessions based on the session change enable/disable information,
when it is judged that the one of the first IP phone and the second IP phone is not capable of changing sessions, the controller further judges whether the session change is required on the basis of the medium information,
when it is judged that the session change is required on the basis of the medium information, the controller further judges whether a version is lower than a predetermined version that is capable of changing sessions,
when it is judged that the version is lower than the predetermined version, the controller judges that the RTP packet processor is needed.

7. The IP device exchange apparatus according to claim 6, wherein the call instruction received from the first IP phone includes a medium requested by the first IP phone and the version information of the first IP phone,
it is judged that the session change is required when the condition information associated with the type of medium corresponding to the medium included in the call instruction indicates that the session change is required, and
the controller judges whether the version included in the call instruction is lower than the predetermined version.

8. A call connection changing method of an IP device exchange apparatus having a connector which is connectable to a plurality of IP phones, including a first IP phone and a second IP phone, the method comprising:
storing, in a memory, a coding scheme obtained through a negotiation to establish a call between the plurality of IP phones, and a session change enable/disable information, indicating whether or not each of the plurality of IP phones is capable of changing sessions;
employing the coding scheme stored in the memory;
judging, when receiving a call instruction for a call connection between the first IP phone and the second IP phone of the plurality of IP phones while neither the first IP phone nor the second IP phone is involved in a call, whether each of the first IP phone and the second IP phone has a function for changing sessions on the basis of the session change enable/disable information of the first IP phone and the second IP phone;
transferring, when at least one of the first IP phone and the second IP phone is judged not to have the function for changing sessions, RTP packets between the first IP phone and the second IP phone to communicate with each other via a RTP packet processor within the IP device exchange apparatus; and establishing a communication between the first IP phone and the second IP phone with each other without using the RTP packet processor, when the first IP phone and the second IP phone are judged to have the function for changing the session.

9. The call connection changing method according to claim 8, wherein the connector is connected to the first IP phone, the second IP phone, and a third IP phone of the plurality of IP phones,
the storing stores in the memory the coding scheme obtained by call setting which is negotiated between the first IP phone and the second IP phone,
receiving a first call instruction for a call connection to the second IP phone from the third IP phone during RTP packet communication between the first IP phone and the second IP phone via the RTP packet processor;
the employing employs the stored coding scheme to perform, between the third IP phone and the IP device exchange apparatus, call setting between the second IP phone and the third IP phone, while maintaining the call connection between the first IP phone and the second IP phone; and
changing the call connection between the first IP phone and the second IP phone to the call connection between the second IP phone and the third IP phone by transmitting RTP packets via the RTP packet processor.

10. The call connection changing method according to claim 9, wherein a coding scheme in common with the stored coding scheme is selected among a plurality of coding schemes of the third IP phone that is contained in the first call instruction.

11. The call connection changing method according to claim 9, wherein when changing the call connection between the first IP phone and the second IP phone to the call connection between the second IP phone to the third IP phone, a source of a packet transmitted from the second IP phone is modified to an address of the IP device exchange apparatus, a destination of the packet transmitted from the second IP phone is modified to an address of the third IP phone, a source of a packet transmitted from the third IP phone is modified to the address of the IP device exchange apparatus, and a destination of the packet transmitted from the third IP phone is modified to an address of the second IP phone.

12. The call connection changing method according to claim 8, further comprising:
storing medium information in the memory, the medium information including condition information, indicating whether a session change is required, associated with a type of medium, the type of medium including at least audio data and image data; wherein
judging whether a session change is required on the basis of the medium information,
wherein the first IP phone and the second IP phone communicate with each other by transferring the RTP packets via the RTP packet processor when it is judged that the session change is required.

13. An IP device exchange apparatus, comprising:
a connector that is connectable to a plurality of IP phones, including a first IP phone, a second IP phone, and a third IP phone;
a memory configured to store a coding scheme obtained through a negotiation to establish a call between the plurality of IP phones, and to store session change enable/disable information, indicating whether or not each of the plurality of IP phones is capable of changing sessions;

a RTP packet processor configured to switch RTP packets between the IP phones communicating with each other; and
a controller configured to, when receiving a call instruction for a call connection between the first IP phone and the second IP phone of the plurality of IP phones, employ the coding scheme stored in the memory, and judge whether the RTP packet processor is needed on the basis of the session change enable/disable information of the first IP phone and the second IP phone,
wherein when the RTP packet processor is judged to be needed, the RTP packets are switched between the first IP phone and the second IP phone communicating with each other via the RTP packet processor within the IP device exchange apparatus,
wherein when changing the call connection between the first IP phone and the second IP phone to a call connection between the second IP phone and the third IP phone, the controller modifies a source of a packet transmitted from the second IP phone to an address of the IP device exchange apparatus, a destination of the packet transmitted from the second IP phone to an address of the third IP phone, a source of a packet transmitted from the third IP phone to the address of the IP device exchange apparatus, and a destination of the packet transmitted from the third IP phone to an address of the second IP phone, and
wherein the controller judges that the RTP packet processor is not needed when the enable/disable information indicates that the first IP phone and the second IP phone are capable of changing sessions.

14. The IP device exchange apparatus, according to claim 13, wherein when the call instruction is received, the controller judges whether one of the first IP phone and the second IP phone is capable of changing sessions based on the session change enable/disable information,
when it is judged that the one of the first IP phone and the second IP phone is not capable of changing sessions, the controller further judges whether the session change is required on the basis of medium information stored in the memory, the medium information includes condition information, indicating whether a session change is needed, in association with a type of medium, the type of medium including at least audio data and image data,
when it is judged that the session change is required on the basis of the medium information, the controller further judges whether a version is lower than a predetermined version that is capable of changing sessions,
when it is judged that the version is lower than the predetermined version, the controller judges that the RTP packet processor is needed.

15. The IP device exchange apparatus according to claim 13, wherein
the connector is connected to the first IP phone, the second IP phone, and the third IP phone of the plurality of IP phones;
the memory stores the coding scheme obtained by call setting which is negotiated between the first IP phone and the second IP phone, and
the controller, when receiving a first call instruction for a call connection to the second IP phone from the third IP phone during RTP packet communication between the first IP phone and the second IP phone via the RTP packet processor, employs the coding scheme stored in the memory to perform, between the third IP phone and the IP device exchange apparatus, call setting between the second IP phone and the third IP phone, while maintaining the call connection between the first IP phone and the second IP phone, thereby changing the call connection between the first IP phone and the second IP phone to the call connection between the second IP phone and the third IP phone by transmitting RTP packets via the RTP packet processor.

* * * * *